(12) United States Patent
Christiansen

(10) Patent No.: US 9,568,308 B2
(45) Date of Patent: Feb. 14, 2017

(54) MULTI-INSTRUMENT CALIBRATION STANDARD

(71) Applicant: Douglas J. Christiansen, Lindon, UT (US)

(72) Inventor: Douglas J. Christiansen, Lindon, UT (US)

( * ) Notice: Subject to any disclaimer, the term of this patent is extended or adjusted under 35 U.S.C. 154(b) by 640 days.

(21) Appl. No.: 14/074,550

(22) Filed: Nov. 7, 2013

(65) Prior Publication Data

US 2015/0121991 A1 May 7, 2015

(51) Int. Cl.
*G01B 3/30* (2006.01)
*G01B 21/04* (2006.01)

(52) U.S. Cl.
CPC .......... *G01B 21/042* (2013.01); *G01B 3/30* (2013.01)

(58) Field of Classification Search
CPC ....... G10B 21/042; G01B 3/30; G01B 21/042; G01C 25/00; B25J 9/1692; B62D 15/02; B82Y 35/00; B60G 2400/252
USPC ........................................ 73/1.75, 1.79, 1.81
See application file for complete search history.

(56) References Cited

U.S. PATENT DOCUMENTS

| | | | | |
|---|---|---|---|---|
| 2,400,441 A | * | 5/1946 | Sconce | G01B 3/306 33/567.1 |
| 2,465,449 A | * | 3/1949 | Harris | G01B 3/306 33/567.1 |
| 3,326,050 A | * | 6/1967 | Kraus | G01G 19/00 33/456 |
| 3,908,278 A | | 9/1975 | Sundahl | |
| 4,065,854 A | * | 1/1978 | Reed | G01B 3/30 33/567 |
| 4,078,418 A | * | 3/1978 | Rips | G01B 5/213 33/502 |
| 4,665,623 A | * | 5/1987 | Wright | B43L 7/12 33/419 |
| 4,930,227 A | | 6/1990 | Ketchpel | |
| 5,309,648 A | * | 5/1994 | Allard | G01B 3/30 33/511 |
| 5,430,952 A | | 7/1995 | Betts | |
| 5,435,074 A | | 7/1995 | Holevas et al. | |

(Continued)

FOREIGN PATENT DOCUMENTS

| | | |
|---|---|---|
| CN | 2235602 Y | 9/1996 |
| CN | 202013157 U | 10/2011 |
| DE | 29701281 U1 | 3/1997 |
| EP | 1860398 B1 | 11/2007 |
| EP | 1931935 B1 | 11/2008 |

OTHER PUBLICATIONS

Europac Precision; Guage Blocks for the Calibration of Caparators; http://www.europacprecision.com/products/calibration-equipment/gauge-block-comparators/gauge-blocks-for-the-calibration-of-comparators.htm; pp. 14-15; Jan. 2009.

(Continued)

*Primary Examiner* — John Fitzgerald
*Assistant Examiner* — Truong Phan
(74) *Attorney, Agent, or Firm* — Fabian VanCott; Tyler Jeffs

(57) ABSTRACT

A calibration standard includes a base and an outside measurement gage block disposed in a recess of the base such that edges and calibration surfaces of the outside measurement gage block are protected by the base and allow access to the calibration surfaces by a caliper. A method for calibrating calipers using the calibration standard is also provided.

20 Claims, 19 Drawing Sheets

(56) References Cited

U.S. PATENT DOCUMENTS

| | | | |
|---|---|---|---|
| 6,014,886 A * | 1/2000 | Anderson | G01B 3/32 33/502 |
| 6,338,204 B1 | 1/2002 | Howle | |
| 6,880,260 B2 | 4/2005 | Baida | |
| 6,901,672 B1 | 6/2005 | Reilly | |
| 7,299,565 B2 | 11/2007 | Marshall et al. | |
| 7,735,237 B1 * | 6/2010 | Moon | G01B 3/20 33/783 |
| 8,438,748 B1 * | 5/2013 | Moon | G01B 3/20 33/783 |
| 2002/0144420 A1 * | 10/2002 | Mora | G01B 3/56 33/536 |
| 2008/0156066 A1 | 7/2008 | Jeromin | |
| 2011/0147555 A1 * | 6/2011 | Harris | E04F 13/0855 248/286.1 |
| 2011/0162434 A1 | 7/2011 | Rastogi | |

OTHER PUBLICATIONS

Anyi Tools; Anyi Measuring; http://www.anyimeasuring.com/; copyright 2010.

Doiron et al; The Gauge Block Handbook; Dimensional Metrology Group Precision Engineering Division National Institute of Standards and Technology; pp. 1-143; http://emtoolbox.nist.gov/Publications/NISTMonograph180.pdf; Jan. 2009.

Tecsupply; http://www.tecsupply.co.in/gauge-and-instruments.html; 1996.

Direct Industry; http://www.directindustry.com/prod/ultra-prazision-messzeuge/vernier-calipers-29541-181138.html.

http://typesofgauges.blogspot.com/; Types of Guages; Dec. 14, 2011.

Crawford et al; How to Calibrate Vernier Calipers; http://www.ehow.com/how_4840356_calibrate-vernier-calipers.html; 1999.

http://www.table-saw-guide.com/digital-calipers.html; Digital Calipers—Make Good Use of Them in Your Workshop; 2010.

Measuring Tools and Instruments; http://www.measuring-tools.biz/measuring-instruments/parts-caliper.html; Parts of the Vernier CalipeR.

http://www.ebay.com.au/itm/150mm-6inch-Vernier-Caliper-Calliper-Ruler-Micrometer-Scale-Lightweight-Plastic-/360480222500; 150mm 6inch Vernier Caliper Calliper Ruler Micrometer Scale Lightweight Plastic.

Dover Motion; http://www.dovermotion.com/KnowledgeCenterTechInfo.aspx?ID=AbbeError; pp. 171-172.

* cited by examiner

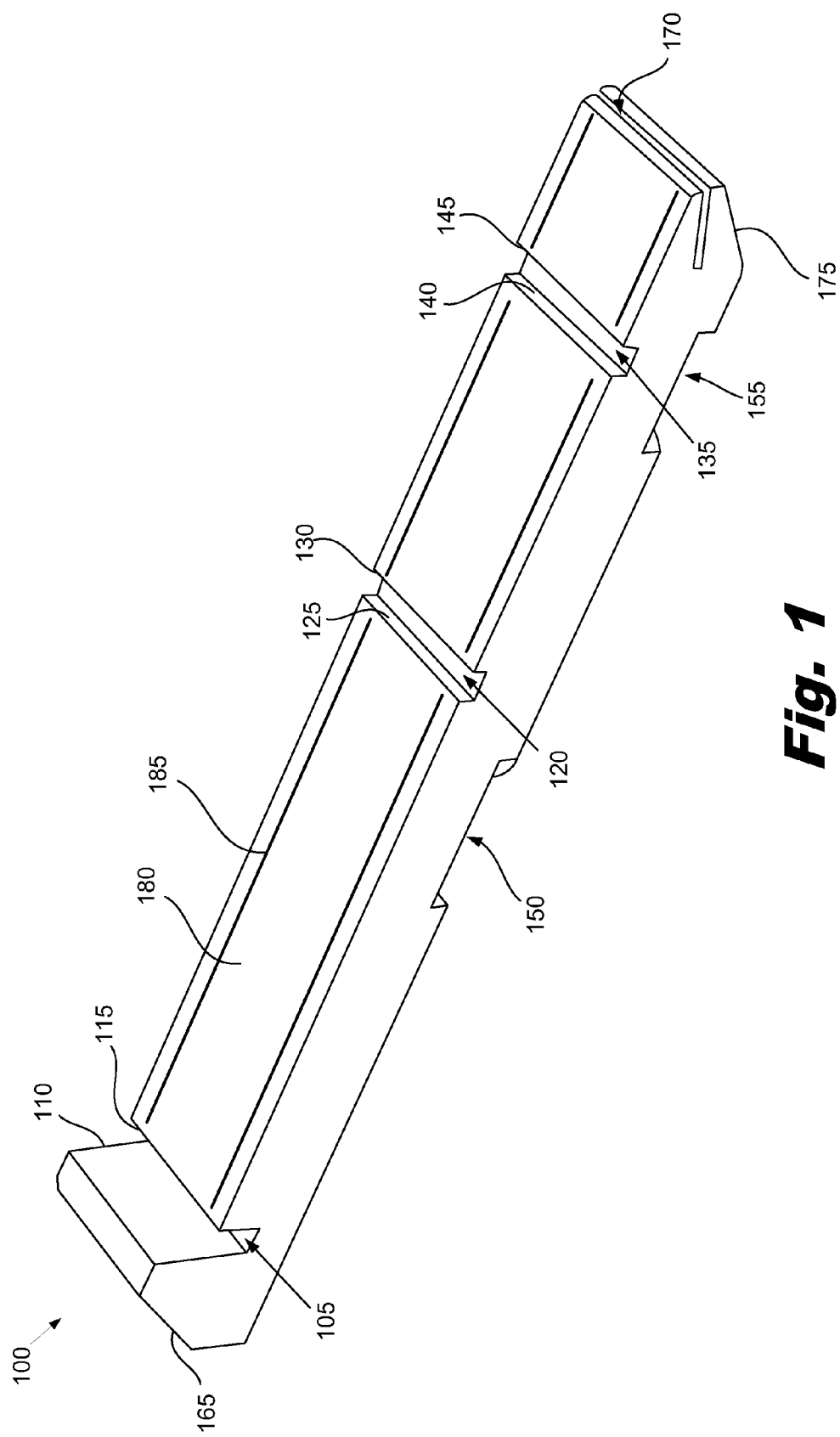

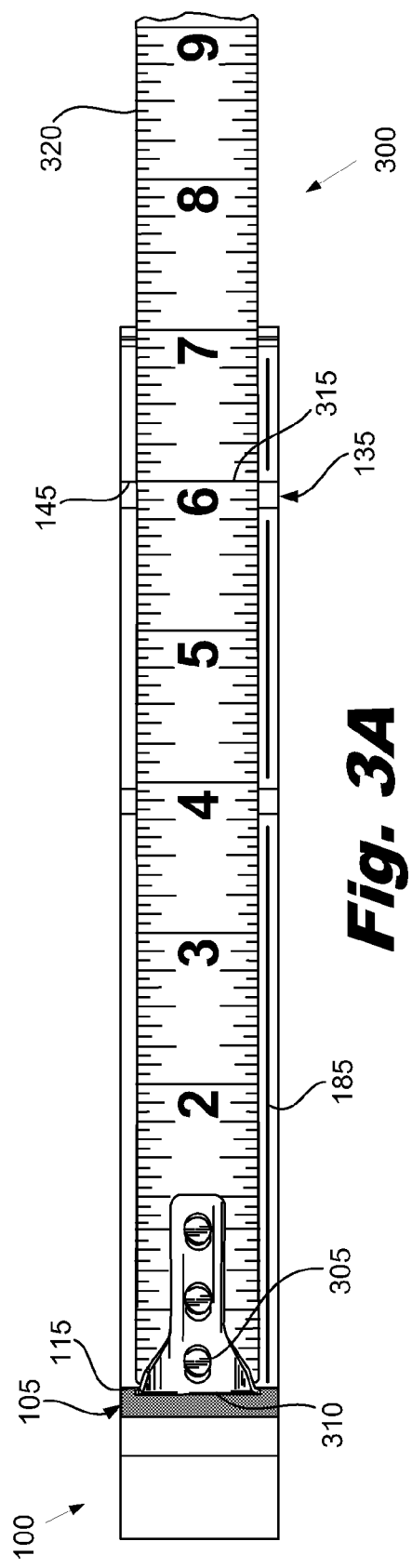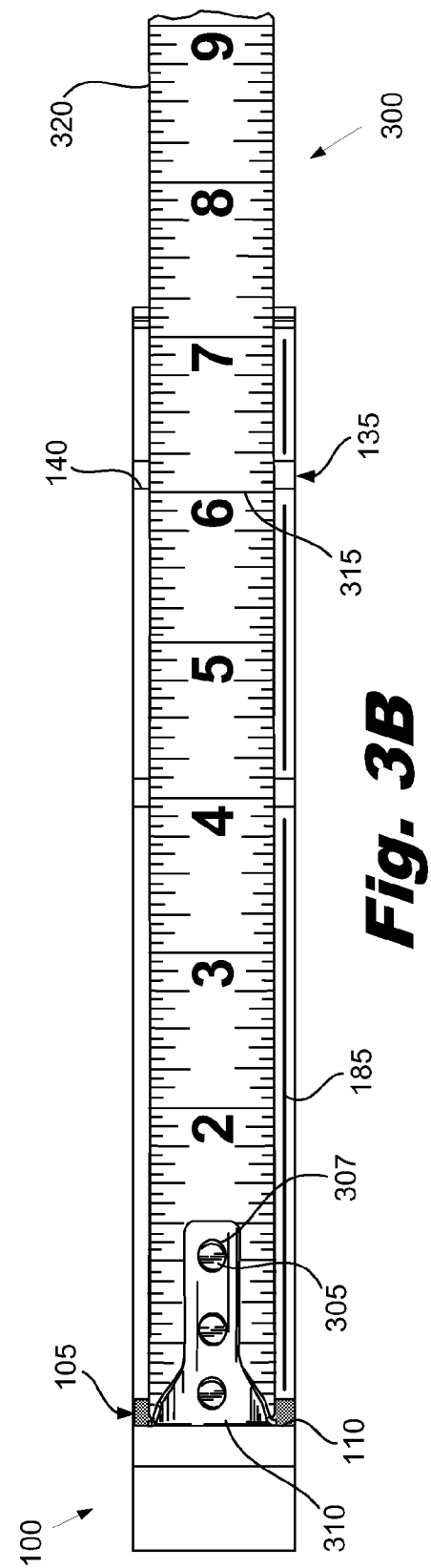

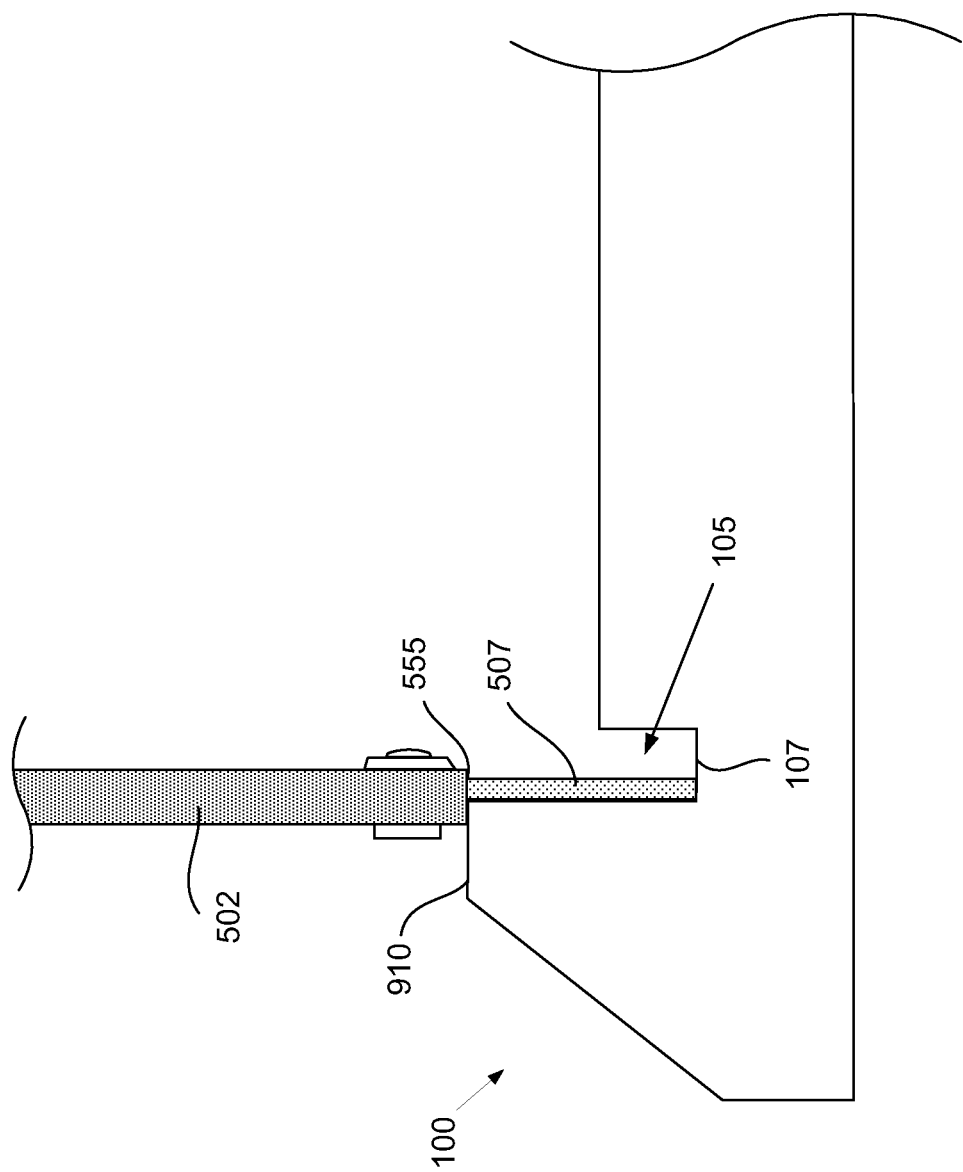

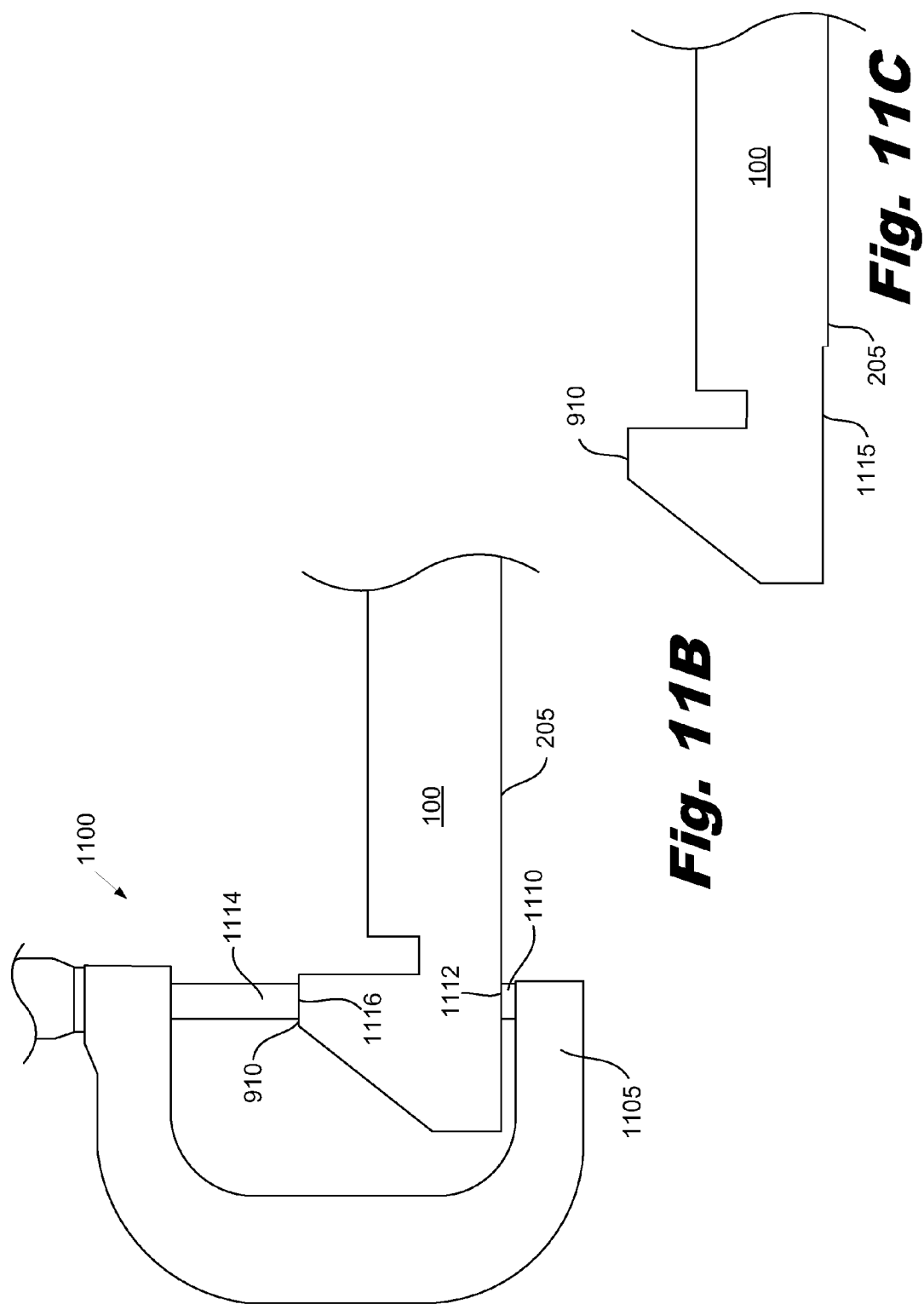

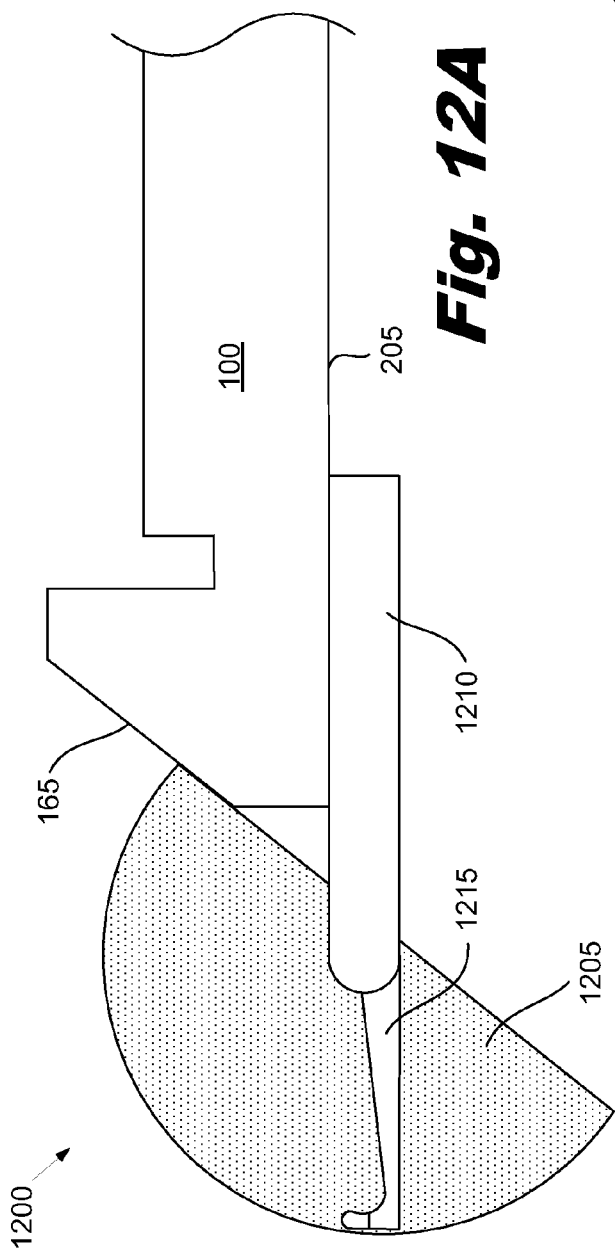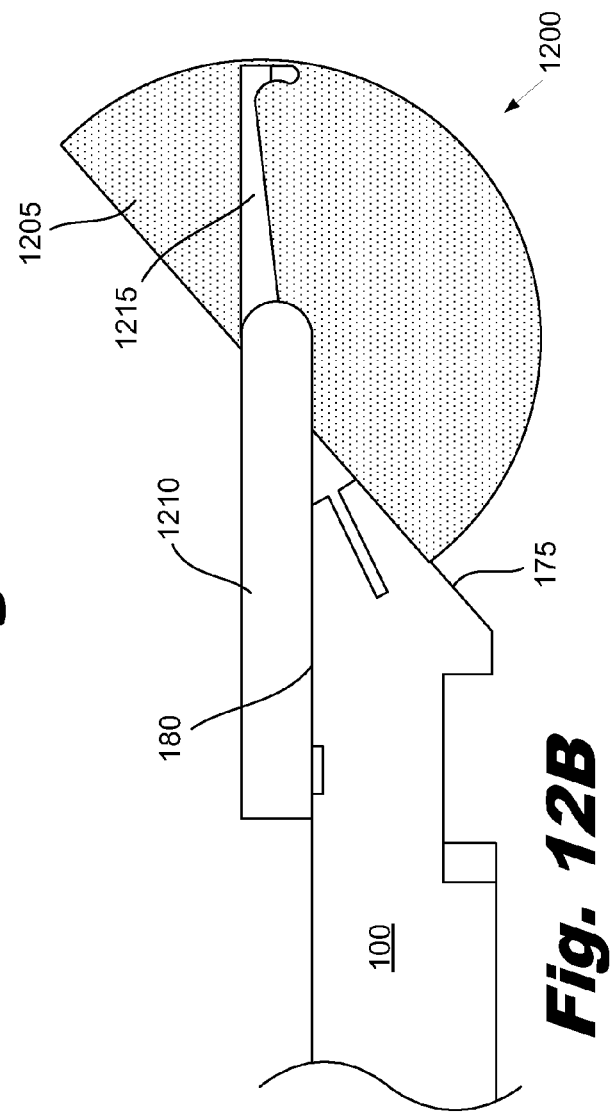

MULTI-INSTRUMENT CALIBRATION STANDARD

BACKGROUND

Accuracy is the degree of conformity of a measured or calculated quantity to its true value. Precision or repeatability is the degree to which a number of measurements or calculations show the same or similar results. The results of a measurement can be accurate but not precise, precise but not accurate, neither, or both. The measurement is valid if it is both accurate and precise.

To determine if a measuring device makes valid measurements, a standard with a known dimension can be used. The measuring device is used to measure the standard and the resulting measurement compared to the known dimension of the standard. If the measurement produced by the measurement device is substantially equivalent to the known dimension and the measurement is repeatable, it can be assumed that the measurement device is calibrated to make valid measurements of that particular dimension.

This calibration allows the accuracy/precision of the measuring device to be ascertained over its lifetime and corrective action taken when the accuracy/precision falls below a predetermined value. These measuring devices may include tape measures, calipers, micrometers, protractors, or other devices.

BRIEF DESCRIPTION OF THE DRAWINGS

The accompanying drawings illustrate various embodiments of the present systems and methods and are a part of the specification. The illustrated embodiments are merely examples of the present systems and methods and do not limit the scope thereof.

FIG. 1 is an illustration of a multi-instrument calibration standard, according to one embodiment of principles described herein.

FIG. 3A is a top view of the multi-instrument calibration standard showing pull calibration of a tape measure on the multi-instrument calibration standard, according to one embodiment of principles described herein.

FIG. 3B is a top view of the multi-instrument calibration standard showing push calibration of a tape measure on the multi-instrument calibration standard, according to one embodiment of principles described herein.

FIG. 9 is an illustration of a multi-instrument calibration standard that is used to find a depth measurement of the depth probe of a caliper, according to one embodiment of principles described herein.

FIG. 11B provides an illustration of using the multi-instrument calibration standard to verify the accuracy of a micrometer, according to one embodiment of principles described herein.

FIG. 11 C shows a possible variation to the multi-instrument calibration standard micrometer datum, according to one embodiment of principles described herein.

FIGS. 12A and 12B illustrate using the multi-instrument calibration standard to verify the accuracy of a protractor, according to one embodiment of principles described herein.

Throughout the drawings, identical reference numbers designate similar, but not necessarily identical, elements.

DETAILED DESCRIPTION

Figure 2A:
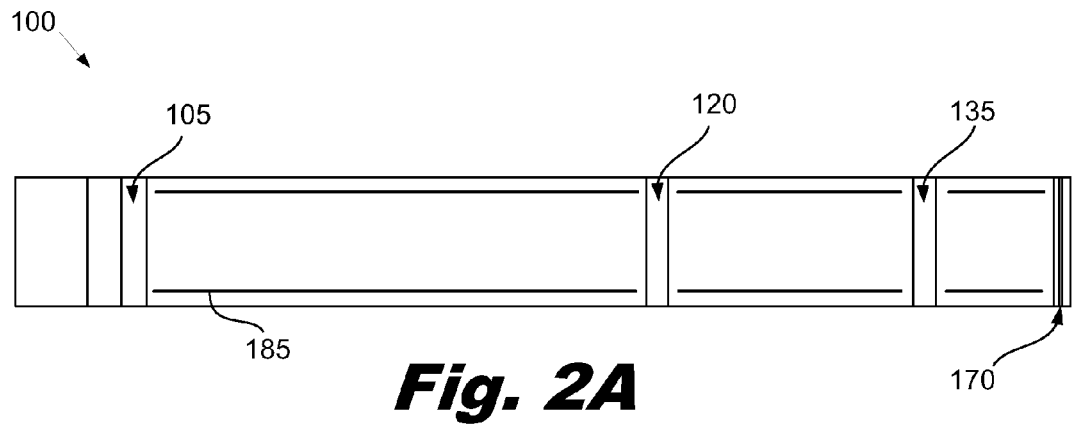
FIGS. 2A-2C illustrate a top, side, and bottom view, respectively, of an illustrative multi-instrument calibration standard, according to one embodiment of principles described herein.

A multi-instrument calibration standard can be used to calibrate various measurement devices. For example, the multi-instrument calibration standard could be used to calibrate tape measures, calipers, micrometers, protractors, or other devices. In one example, various dimensions of the multi-instrument calibration standard could be traceable to a primary standard certified by a recognized authority such as the National Institute of Standards and Technology (NIST).

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

FIG. 1 is an illustration of a multi-instrument calibration standard (100). A multi-instrument calibration standard (100) is a machined block of wood, metal or other material and can be used to calibrate a variety of tools. The top surface (180) is used to calibrate standard and metric tape measures with an end hook. The top surface (180) has an end hook receiving slot (105), a tape measure end hook push reference surface (110), and a tape measure end hook pull reference surface (115) that are used for tape measure calibration. A metric groove (120), containing a metric push reference surface (125) and a metric pull reference surface (130) is used to calibrate metric tape measures and a standard groove (135), also containing a standard push reference surface (140) and a standard pull reference surface (145) is used to calibrate standard tape measures. The push reference surfaces (125, 140) and pull reference surfaces (130, 145) are for comparison of marks on tape measures to these reference surfaces, allowing for verification of tape measure accuracy. End hook adjustment slot (170) is used for straightening tape measure end hooks. Alignment lines (185) may be present to assist a user in aligning a measuring tape, ruler, or other measuring surfaces. Additionally, push reference surfaces (125, 140) and pull reference surfaces (130, 145) can be used for verification of rulers and other measuring devices. The bottom section of FIG. 1 shows gage block cutouts (150, 155) designed to accommodate caliper jaws for caliper calibration. The push reference surface (110) of the end hook receiving slot (105) is also used as a square reference surface for caliper probe and step measurements. FIG. 1 also shows a first angled surface (165) and a second angled surface (175) used for calibrating a protractor.

Figure 2B:
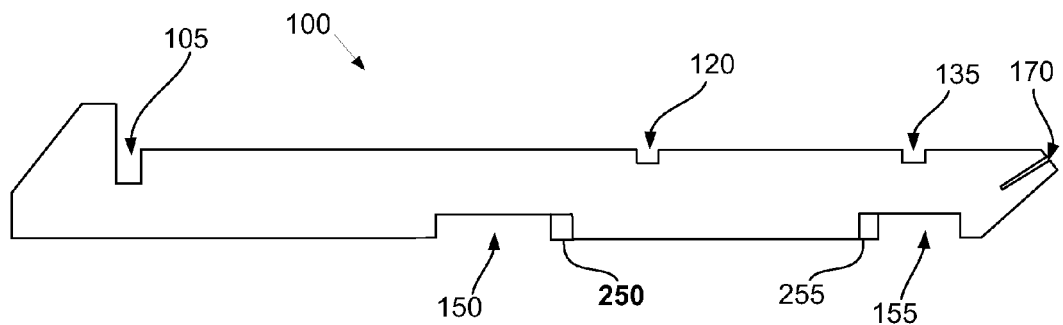
Figure 2C:
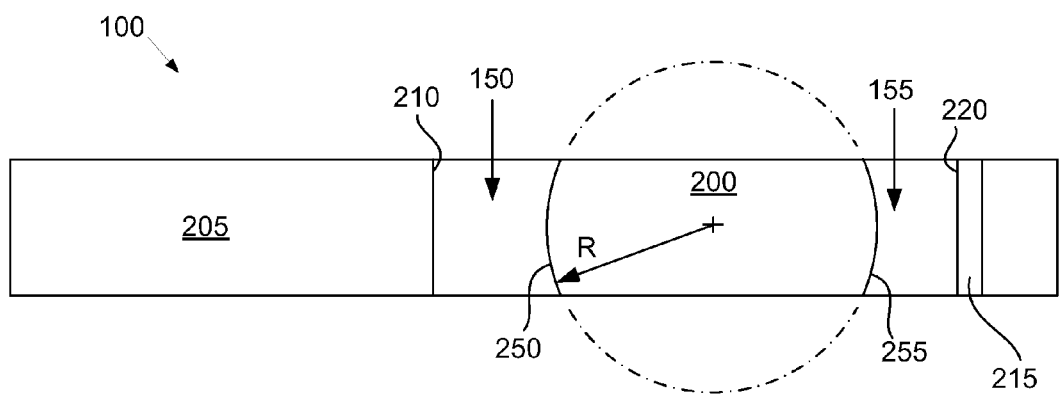

FIGS. 2A-2C illustrate a top, side, and bottom view, respectively, of an illustrative multi-instrument calibration standard (100). According to one illustrative embodiment, the multi-instrument calibration standard (100) comprises a generally rectangular body, with the length of the multi-instrument calibration standard (100) being larger than the height or the width.

FIG. 2A shows the end hook receiving slot (105), the metric groove (120), the standard groove (135), the end hook adjustment slot (170), and the alignment lines (185). These features are used for verification and adjustment of tape measures as described below in FIGS. 3A and 3B. In addition, FIG. 2B shows other elements for verifying the accuracy of calipers. These include gage block cutouts (150, 155) and outside measurement surfaces (250, 255). In this example, the outside measurement surfaces have a cylindrical curvature. In other examples, the outside measurement surfaces may be straight, angled, spherical, or have another shape.

The end hook receiving slot (105) is used for calibrating tape measures and has a length, a width, and a depth. The length, width, and depth of the end hook receiving slot (105) are designed to accommodate the majority of tape measure end hook designs. The tape measure end hook designs may vary from manufacturer to manufacturer and from tape measure to tape measure. According to one illustrative embodiment, the length of the end hook receiving slot (105) is sufficiently large so that the hook portion of the tape measure end hook can fit entirely within the slot. The width of the end hook receiving slot (105) is wider than the thickness of most tape measure end hooks so that the tape measure end hooks may be easily inserted into the end hook receiving slot (105).

The metric and standard grooves (120, 135) shown in FIGS. 2A and 2B are used as calibration bands or edges. Although only the metric and standard grooves (120, 135) are shown, the multi-instrument calibration standard may also have any number of additional grooves, calibration bands, or edges which provide for calibration at other distances. The metric and standard grooves (120, 135) have the same width as the end hook receiving slot (105).

FIG. 2C shows provisions for referencing calipers. Inside measurement surfaces (210, 220) and curved outside measurement surfaces (250, 255) are used for verifying the accuracy of calipers. Gage block cutouts (150,155) form a protected outside measurement gage block (200). In one embodiment, the protected outside measurement gage block (200) has curved outside measurement surfaces (250, 255). These curved outside measurement surfaces (250, 255) each have the same radius and share a common center. Specifically, the curved outside measurement surfaces (250, 255) can be visualized as sections of a right circular cylinder with its center in the middle of the outside measurement gage block (200) having a radius R. Another way to describe the outside measurement gage block (200) is as a section of cylindrical disk. The curved outside measurement surfaces (250, 255) of the outside measurement gage block (200) allow for angular movement of the caliper jaws and for validation measurements to be made at different depths with the caliper. This is further discussed below with respect to FIGS. 5, 6, and 7.

The outside measurement gage block (200) may be fixed or removable. The sidewalls of the plateaus (205, 215) are the inside measurement surfaces (210, 220) for caliper verification. This is described in further detail with respect to FIG. 8. A portion of the left plateau (205) also serves as a micrometer datum surface.

FIGS. 3A and 3B is a top view of the multi-instrument calibration standard (100) showing the pull and push calibration of a tape measure (300) on the multi-instrument calibration standard (100). A tape measure is a flexible form of ruler. The tape measure consists of a ribbon of cloth, plastic, or metal with linear-measure markings, often in both imperial and metric units. Tape measures designed for carpentry or construction often use a stiff, curved metallic ribbon that can remain stiff and straight when extended, but retracts into a coil for convenient storage. A tape measure of 3 to 100 feet can wind into a relatively small housing. This type of tape measure will have a floating end hook to aid in measuring. The end hook consists of a tang and a hook. The tang is designed to slide a distance equal to the hook's thickness, to provide both inside and outside measurements that are accurate. The sliding action of the end hook is typically accomplished by rivets attached to the blade that slide in oblong rivet holes in the tang of the end hook.

In many instances, measurement accuracy is essential to creating a quality finished product. For example, in cabinet-making, a series of 1/16" errors in cutting 8 pieces could result in an assembled cabinet which is 1/2" too large or 1/2" too small. The combined discrepancies add up to significant errors. A set of cabinets that are 1/2" too big won't fit the opening they were designed for, thus causing loss of time and money to modify or remake the cabinets.

The accuracy of tape measures is particularly important when several tape measures are being used by different people or at different locations. For example, a cabinetmaker makes a cabinet door, and then orders glass to fit it using a tape measure. The glass company cuts glass for the same cabinet door using their tape measure. If one or the other has not used an accurate tape measure, the glass will not fit in the door as designed.

In one of many possible embodiments, the present illustrative apparatus provides pass/fail calibrations of a tape measure making both push and pull measurements. If the tape measure passes both the push and the pull calibrations, it can be certified that the tape measure makes measurements that are accurate within a specified tolerance. If the tape measure fails either the push or the pull calibration, the tape measure fails the calibration and corrective action should be taken.

In FIG. 3A, the tape measure end hook (310) is pulled against the end hook pull reference surface (115) of the end hook receiving slot (105). In this example, by placing the tape measure (300) parallel to the alignment line (185), the tape measure end hook (310) is squarely aligned with the end hook pull reference surface (115). The six inch mark (315) on the blade (320) of the tape measure (300) is compared to the standard pull reference surface (145) which is the far edge of the standard groove (135) of the multi-instrument calibration standard (100). If the six inch mark (315) closely matches the pull reference surface (145), the tape measure (300) accuracy is verified for pull measurements at six inches. Most of the tape measure measurement errors originate with the tape measure end hook which can be manufactured out of tolerance and/or later damaged by dropping or handling. The blade of the tape measure is less likely to contribute to errors because it is a single piece of highly resilient material (typically coated or painted spring steel). The verification of the tape measure's ability to accurately measure a pull distance of six inches shows that the tape measure end hook is working properly for pull measurements. It can then be assumed that the tape measure maintains a minimum accuracy for pull measurements along its length. If higher levels of confidence are needed, the pull calibration process can also be performed at different distances.

FIG. 3B is a top view of the multi-instrument calibration standard (100) showing the push calibration of the tape measure (300) on the multi-instrument calibration standard (100). The tape measure end hook (310) is pushed against the end hook push reference surface (110) of the end hook receiving slot (105). In this example, by placing the tape measure (300) parallel to the alignment line (185), the tape measure end hook (310) is squarely aligned with the end hook push reference surface (110). The six inch mark (315) on the blade (320) of the tape measure (300) is compared to the standard push reference surface (140) which is the near edge of the standard groove (135) of the multi-instrument calibration standard (100).

In this example, the six inch mark (315) on the blade (320) does not exactly line up with the push reference surface (140). This could be due to a number of factors, such as a bent tape measure end hook (310), misplaced rivets (305), or worn rivet holes (307) in the tape measure end hook (310). This tape measure (300) shows error and fails the push measurement verification. The tape measure end hook (310) can be adjusted (for example, straightened if it was bent when the tape measure was dropped) by inserting the tape measure end hook (310) into the end hook adjustment slot (170, FIG. 2B) and applying appropriate force. After the adjustment is made, the tape measure can be calibrated again. If the tape measure is unable to be brought to required accuracy, the tape measure may need to be discarded and replaced.

Calipers are precision tools that can be important to calibrate. Calipers are measuring devices that measure a distance between two opposing surfaces on an object. There are different types of calipers that the multi-instrument calibration standard (100) can be used to calibrate. These different types of calipers include inside calipers, outside calipers, vernier calipers, dial calipers, digital calipers, etc. In the examples given in FIG. 4 thru FIG. 9, a dial caliper has been used.

Figure 4:
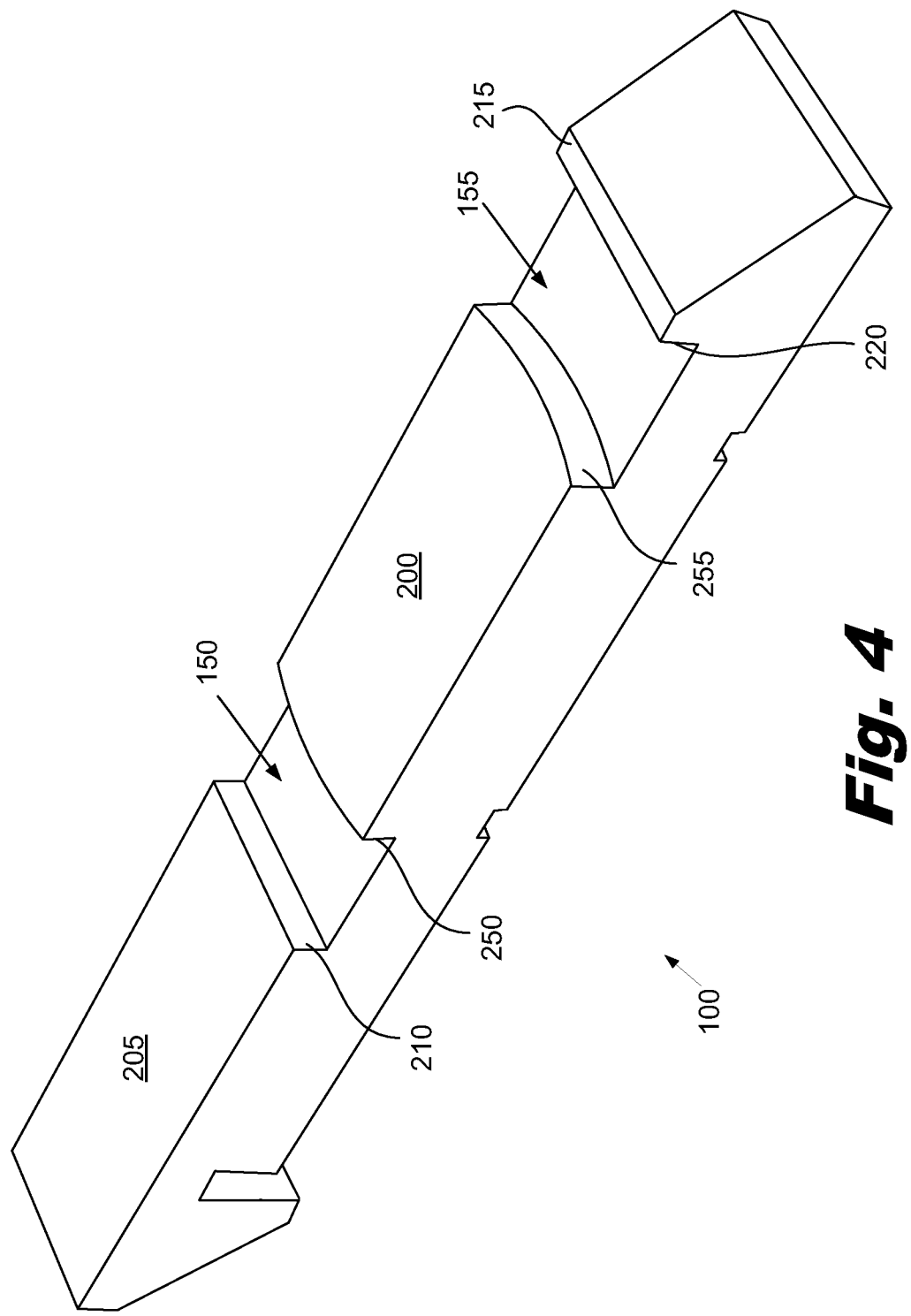
FIG. 4 is a perspective view of the bottom side of the multi-instrument calibration standard, according to one embodiment of principles described herein.

FIG. 4 is a perspective view of the bottom side of the multi-instrument calibration standard (100). In some embodiments, this side of the multi-instrument calibration standard (100) includes a number of precision features that can be used as inside and outside measurement standards for verification of caliper accuracy. These features include plateau areas (205, 215) and an outside measurement gage block (200). The outside measurement gage block (200) is separated from the plateaus (205, 215) by gage block cutouts (150, 155). The end surfaces (210, 220) of the plateaus (205, 215) are straight sidewalls and can be used for verification of inside measurements of a caliper.

The outside measurement gage block (200) includes curved sidewalls that are used as curved outside measurement surfaces (250, 255). This allows for placement of caliper jaws around the outside measurement gage block (200). Curved outside measurement surfaces (250, 255) are used to verify the accuracy of the outside measurements taken with the caliper.

In one example, the outside measurement gage block (200), its' curved outside measurement surfaces (250, 255), the plateaus (205, 215), and their inside measurement surfaces (210, 220) are machined out of the same monolithic piece of material. For example, a block of metal such as stainless steel, Invar®, or other suitable material may be machined to form the outside measurement gage block (200) and the various measurement surfaces (210, 220, 250, 255). These measurement surfaces are precisely measured and recorded. These known measurements are used to determine the measurement accuracy of various calipers.

Figure 5:
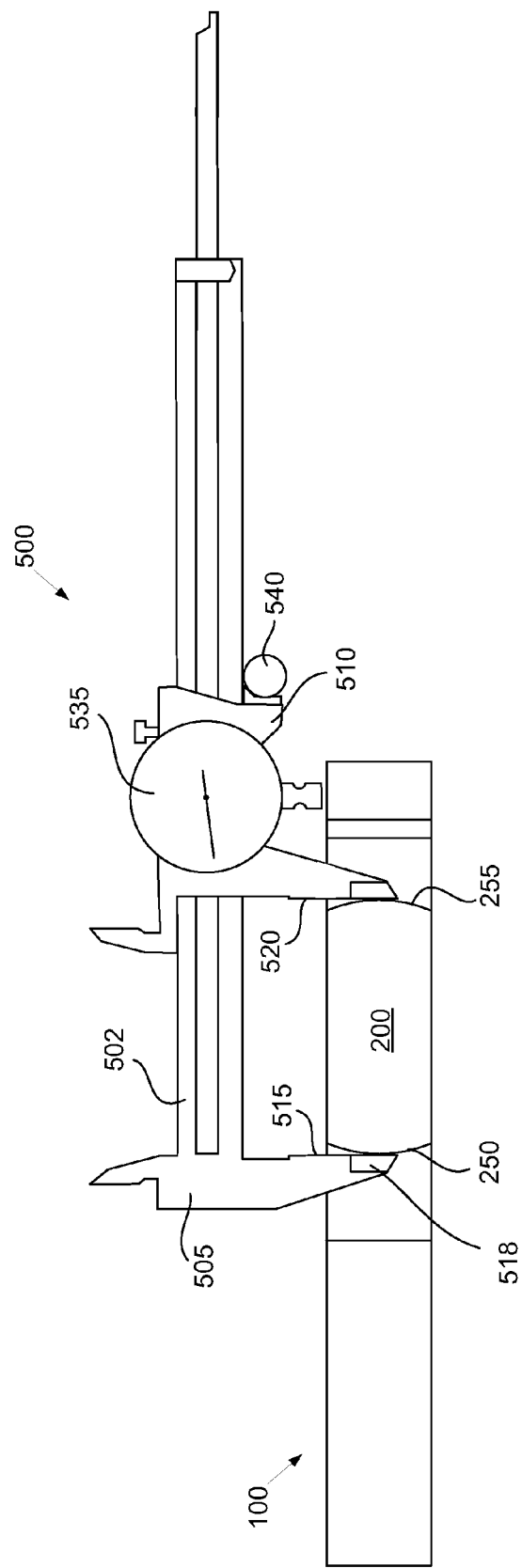
FIG. 5 is a diagram that shows how to verify the accuracy of the outside measurement of a dial caliper at the tip of the caliper using the multi-instrument calibration standard, according to one embodiment of principles described herein.

FIG. 5 is a diagram that shows how to verify the accuracy of a dial caliper (500) using the multi-instrument calibration standard (100). One challenge in correctly calibrating and using a caliper of the type illustrated in FIG. 5 is that the outside measurement jaws/surfaces (515, 520) extend a significant distance away from the rail (502) of the dial caliper (500). In essence, the outside measurement jaws are cantilevered from the rail (502) of the caliper. Consequently, if one of the jaws is misaligned (i.e. not perpendicular to the rail (502)) or loose, the measurement error will be dependent on measurement location along the jaws. For example, if an outside measurement is made by placing an object very close to the rail (502) of the caliper, the error may be small. Conversely, if an outside measurement is made by placing the object between the tips (518) of the measurement jaws, the error may be much larger or smaller. Additionally, the amount of pressure exerted on the object can result in different measurements. For example, assume that an operation places uniform pressure on an object sandwiched between the outside measurement surfaces (250, 255). If the object contacts the jaws close to the rail (502), a first measurement may be obtained. If the object contacts the jaws at the tips, the same amount of pressure will produce a different reading (typically smaller reading) because of the flexure/distortion of the jaws.

The variable error due to varying distance away from an origin is typically called an Abbé error. Abbé error is insidious, and can best be countered by assuming the presence of angular error in a system and then working to minimize both the underlying error and its effect. The principles described below show how to identify and quantify Abbé error in calipers.

FIG. 5 is a diagram showing how to verify the accuracy of the outside measurement of a dial caliper (500) at the tip (518) of the caliper (500) using the outside measurement gage block (200) of the multi-instrument calibration standard (100). The fixed jaw (505) and the moveable jaw (510) of the dial caliper (500) are placed around the curved outside measurement surfaces (250, 255) of the outside measurement gage block (200). The moveable jaw (510) is slid along the rail (502) toward the fixed jaw (505) until the moveable jaw (510) and the fixed jaw (505) of the dial caliper (500) are adjusted around the outside measurement gage block (200). This brings the outside measurement surfaces (515, 520) on the fixed and moveable jaws (505, 510) into contact with the curved outside measurement surfaces (250, 255) of the outside measurement gage block (200). The thumb roller (540) is used to apply consistent pressure in taking measurements with the dial caliper (500).

The measurement indicator (535) may have provisions to adjust or match a known measurement such as the outside measurement gage block (200). For example, if the known diameter of the outside measurement gage block (200) is 2.750 inches and the dial caliper (500) reads 2.745 inches, the dial can be adjusted so that it reads 2.750 inches. This adjustment allows future measurements to be more accurate. This measurement technique can calibrate the caliper for measurements that are made using the tips (518) of the caliper jaws. This could be adjusted to show plus or minus errors.

Figure 6:
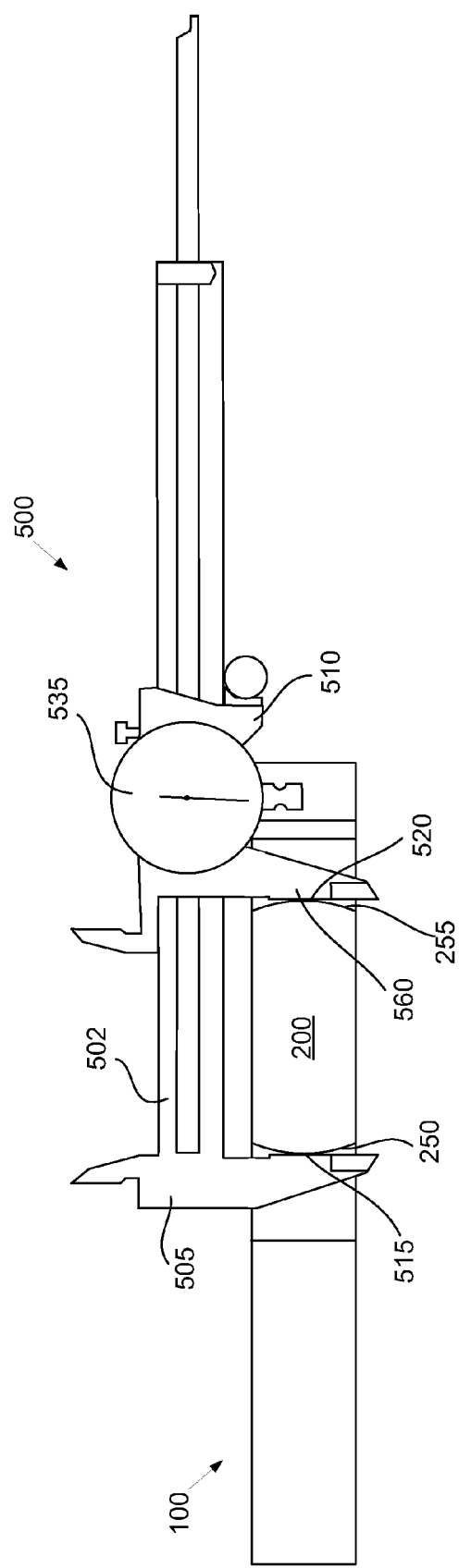
FIG. 6 is a diagram that shows how to verify the accuracy of the outside measurement of a dial caliper at the throat of the caliper using the multi-instrument calibration standard, according to one embodiment of principles described herein.

FIG. 6 is a diagram that shows how to verify the accuracy of the outside measurement of a dial caliper (500) at the throat (560) of the dial caliper (500) using the multi-instrument calibration standard (100). The fixed jaw (505) and the moveable jaw (510) of the dial caliper (500) are placed around the curved outside measurement surfaces (250, 255) of the outside measurement gage block (200). The moveable jaw (510) is slid until the outside measuring surfaces (515, 520) of the fixed jaw (505) and the moveable jaw (510) of the dial caliper (500) have contacted the curved outside measurement surfaces (250, 255) of the outside measurement gage block (200) to show a correct measurement reading on the measurement indicator (535). When the tip measurement of FIG. 5 is compared to the throat measurement in FIG. 6, Abbé error can be identified. Abbé error is found when measuring off axis (i.e. using jaws that are cantilevered away from the caliper rail (502)) and a possible angular error is created (i.e. the jaws bend or are not exactly perpendicular to the rail (502) or parallel to each other).

Figure 7:
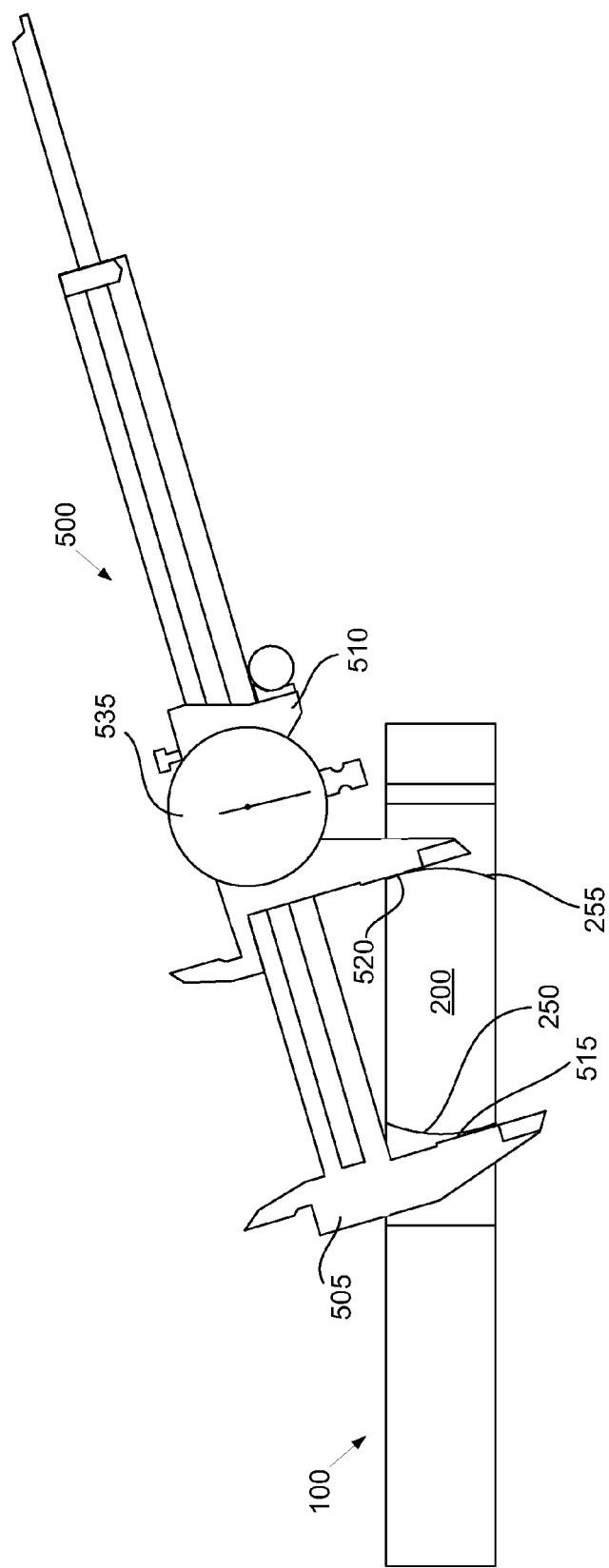
FIG. 7 is an illustration that shows a multi-instrument calibration standard verifying the accuracy of a dial caliper using the partial radius of the outside measurement gage block, according to one embodiment of principles described herein.

FIG. 7 is an illustration that shows a multi-instrument calibration standard (100) verifying the accuracy of the outside measurement of a dial caliper (500) using the partial radius of the outside measurement gage block (200). The fixed jaw (505) and the moveable jaw (510) of the dial caliper (500) are placed around the curved outside measurement surfaces (250, 255) of the outside measurement gage block (200). The moveable jaw (510) is slid until the outside measuring surfaces (515, 520) of the fixed jaw (505) and the moveable jaw (510) of the dial caliper (500) have contacted the curved outside measurement surfaces (250, 255) of the outside measurement gage block (200) to show a correct measurement reading on the measurement indicator (535).

In this example, the dial caliper (500) is at an angle to the outside measurement gage block (200). With a standard outside measurement gage block that has flat parallel ends, having the caliper at an angle would produce a measurement error. However, because the curved outside measurement surfaces (250, 255) of the outside measurement gage block (200) are curved sections of a circular cylinder, there is no measurement error introduced by the angle of the caliper.

Thus, it can be seen that the curved outside measurement surfaces on the outside measurement gage block provide a number of advantages. First, as shown above, the curved outside measurement surfaces eliminate errors introduced by the angle of the caliper. Second, the curved outside measurement surfaces make a point or line contact with jaws of the caliper rather than a plane contact that is produced by using a standard outside measurement gage block with parallel ends. Attempting to calibrate outside measurement jaws with a standard outside measurement gage block can produce erroneous results and conceal Abbé error because the jaws are forced to be parallel and make contact with the ends of the standard outside measurement gage block over their entire surface. In contrast, the curved outside measurement surface of the protected outside measurement gage block (200) can be used to make separate measurements at the tip of the jaws, at the base of the jaws, and anywhere in between. This allows the Abbé error to be identified and quantified. Third, the curved outside measurement surfaces are protected from damage because they are sidewalls in a cutout. The curved outside measurement surfaces are unlikely to be damaged by handling or dropping of the calibration standard because other portions (i.e. the plateaus or ends of the tool) will absorb most of the impact/abrasion.

Figure 8:
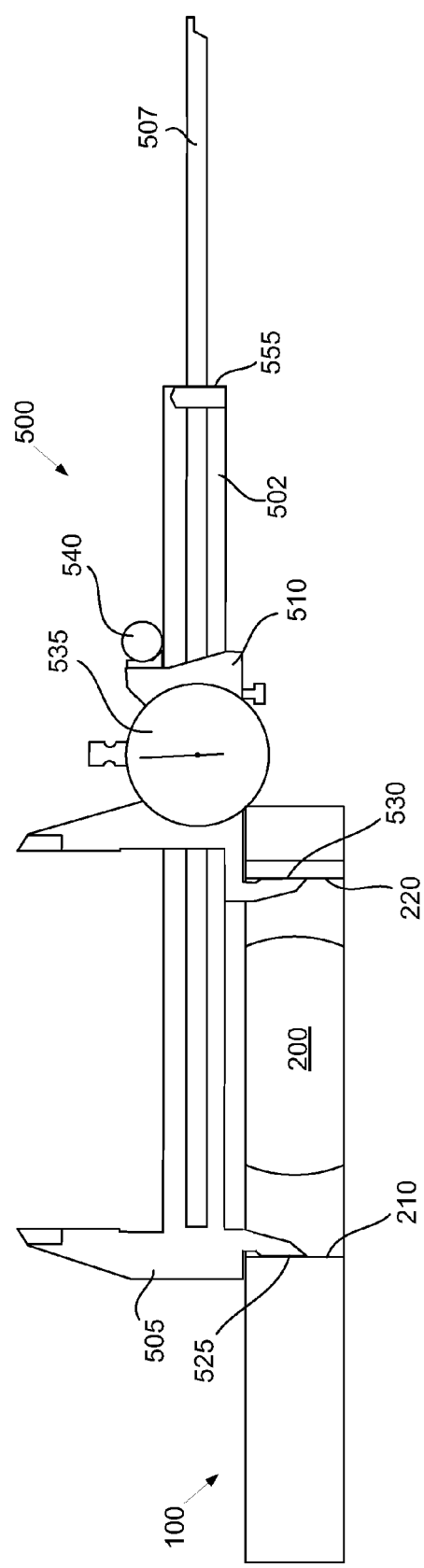
FIG. 8 shows verification of the accuracy of inside measurements of a dial caliper using the multi-instrument calibration standard, according to one embodiment of principles described herein.

FIG. 8 shows verification of the accuracy of inside measurements of a dial caliper (500) using the multi-instrument calibration standard (100). To calibrate the caliper for inside measurements, the moveable jaw of the dial caliper is moved in the opposite direction from when the outside measurements were calibrated. The moveable jaw (510) is slid away from the fixed jaw (505) until their inside measurement surfaces (525, 530) are aligned against the straight sidewall inside measurement surfaces (210, 220) of the multi-instrument calibration standard (100). When the inside measurement surfaces (525, 530) of the moveable jaw (510) and the fixed jaw (505) have contacted the straight sidewall inside measurement surfaces (210, 220), a correct measurement reading is shown on the measurement indicator (535). The thumb roller (540) is used to apply consistent pressure in taking measurements with the dial caliper (500). The measurement indicator (535) may have provisions to adjust or match a known measurement such as the prerecorded measurement of the distance between the straight sidewall inside measurement surfaces (210, 220). This adjustment allows your measurements to be more accurate. This could be adjusted to show plus or minus errors. Also shown on the dial caliper (500) are the caliper rail (502) and the depth probe (507). The depth probe (507) extends from the caliper (500) at the front end (555) of the caliper rail (502). The multi-instrument calibration standard (100) may also be used to verify a depth measurement of the depth probe (507). An example of this is given in FIG. 9.

FIG. 9 is an illustration of a multi-instrument calibration standard (100) that is used to verify a depth measurement of the depth probe (507). The depth probe (507) of a dial caliper (500, FIG. 8) is shown in an upright position. The depth probe (507) has been placed into the tape measure end hook receiving slot (105) until it touches the bottom surface (107) of the slot. The front end (555) of the rail (502) of the dial caliper (500, FIG. 8) is aligned on the reference surface (910) to show the correct reading on the measurement indicator (535, FIG. 8). The offset distance between the reference surface (910) and a bottom surface (107) of the slot is a known distance to a predetermined level of accuracy. Comparison of this known distance with the reading produced by the caliper allows the accuracy of the caliper to be determined. The caliper can then be calibrated or adjusted as needed.

Figure 10A:
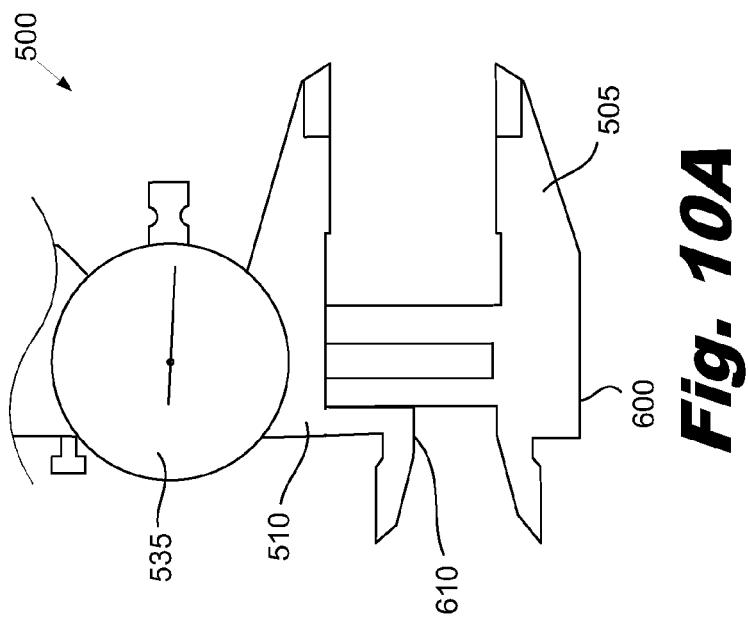
FIGS. 10A and 10B illustrate verification of the step reference of a dial caliper, according to one embodiment of principles described herein.
Figure 10B:
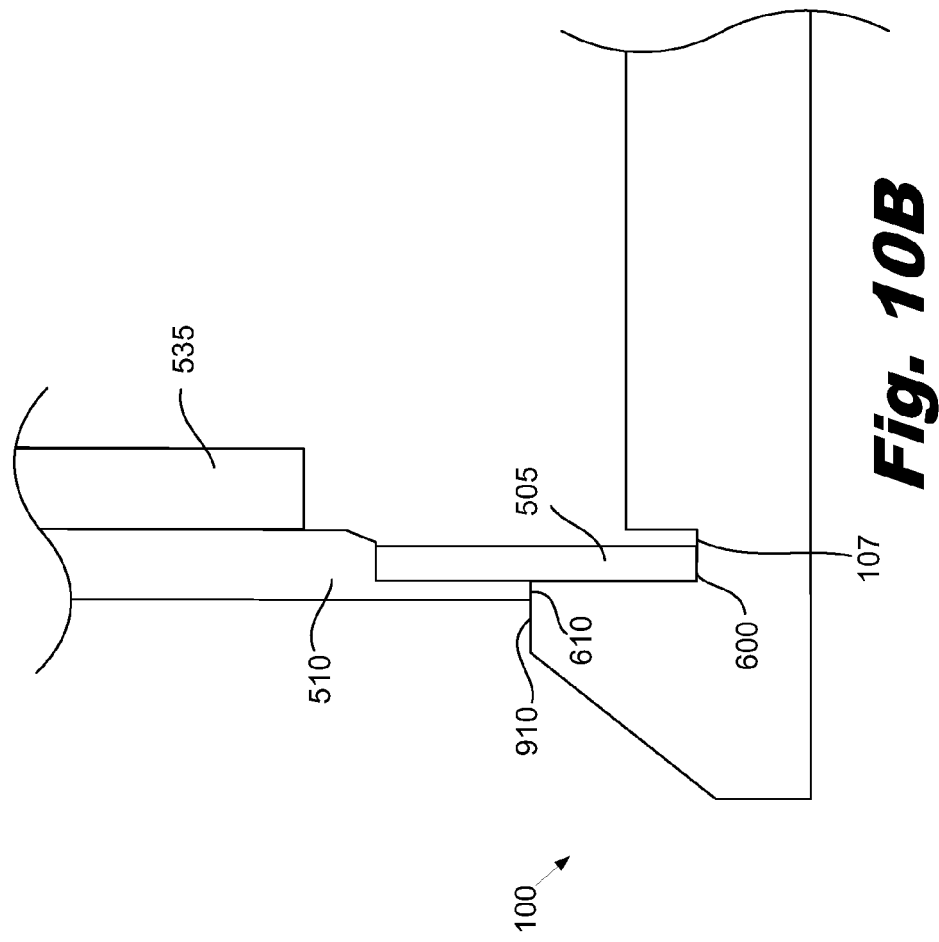

FIGS. 10A and 10B illustrate verification of the step reference of a dial caliper (500). FIG. 10A shows a partial top view of a dial caliper (500). To make a step measurement, a first step measurement surface (600) at the end of the fixed jaw (505) is placed at the bottom of a step and the movable jaw (510) is moved downward until a second step measurement surface (610) of the moveable jaw (510) contacts the upper shelf of the step. The measurement indicator (535) shows the result of the step measurement.

The accuracy of the step measurements of the dial caliper (500) can be verified by using the end hook receiving slot (105, FIG. 2B) of the multi-instrument calibration standard (100) as the step feature. The end hook receiving slot (105, FIG. 2B) is precisely cut into the body of the multi-instrument calibration standard (100). For example, wire electro-discharge machining (wire EDM) may be used to form the slot. This is an inherently accurate process. The dimensions of the slot, and any other features on the multi-instrument calibration standard (100), can be measured against a NIST traceable standard.

FIG. 10B is a side view of the multi-instrument calibration standard (100) verifying the step measurement of a dial caliper (500, FIG. 8). The first step measurement surface (600) of the fixed jaw (505) of the dial caliper (500, FIG. 8) is placed against the bottom surface (107) of the end hook receiving slot (105, FIG. 2B). The second step measurement surface (610) of the moveable jaw (510) is aligned against the reference surface (910) of the multi-instrument calibration standard (100) to show a desired measurement on the measurement indicator (535).

Figure 11A:
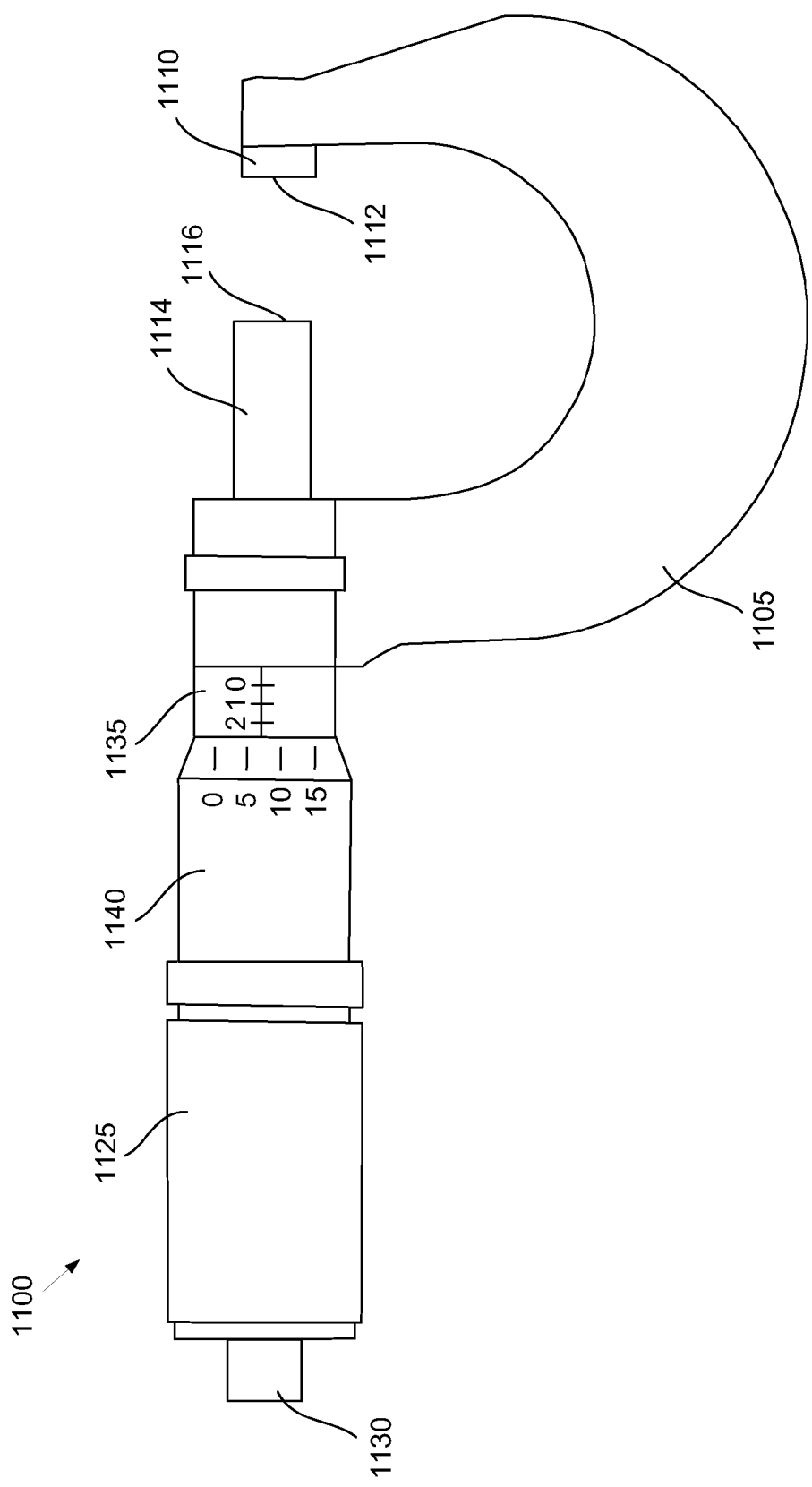
FIG. 11A is a detailed drawing of a micrometer, according to one embodiment of principles described herein.

FIG. 11A is an illustrative drawing of a micrometer (1100). The frame (1105) of the micrometer (1100) in this example is a "U" shape. An anvil (1110) is located on the inside of one leg of the "U" and a movable spindle (1114) extends from the opposite leg. The anvil (1110) is typically formed from hardened steel that has been ground and polished. This process forms a precision measuring face located on the inside surface of the anvil (1110) which is referred to as the anvil face (1112), and a second measuring face (1116) of the moveable spindle (1114), The frame (1105) is attached to the handle (1125) of the micrometer (1100). The spindle (1114) extends from the handle (1125) towards the anvil (1110) and is adjustable toward and away from the anvil (1110). A spindle face (1116) is located at the end of the spindle (1114) and faces the anvil face (1112). At the end of the handle (1125), is the ratchet stop (1130) that is used to make adjustments to the micrometer (1100). The spindle (1114) is a very accurately machined screw. The object to be measured is placed between the spindle face (1116) and the anvil face (1112). The spindle (1114) is moved inward by turning the ratchet stop (1130) or thimble (1140) until the object to be measured is lightly touched by both the anvil face (1112) and the spindle face (1116). The barrel (1135) is stationary with respect to the anvil (1110) and is marked with a scale. The rotation of the thimble (1140) over the barrel (1135) moves markings on the thimble (1140) with respect to the scale on the barrel (1135) to produce a reading of the distance between the anvil face (1112) and the spindle face (1116).

FIG. 11B provides an illustration of using the multi-instrument calibration standard (100) to verify the accuracy of a micrometer (1100). The frame (1105) of the micrometer (1100) holds the anvil (1110) in line with the spindle (1114). The anvil face (1112) is placed against the plateau (205), which is used as a micrometer datum of the multi-instrument calibration standard (100). The spindle face (1116) of the micrometer (1100) is adjusted against the reference surface (910) of the multi-instrument calibration standard (100) using the ratchet stop (1130, FIG. 11A) of the micrometer (1100). This provides a reading on the micrometer (1100) that can be compared to the known dimension between the micrometer datum (205) and the reference surface (910).

FIG. 11C shows a possible variation to the multi-instrument calibration standard (100) micrometer datum (205). In this implementation, the end portion of the micrometer datum surface (205) is recessed. The recessed surface of the end portion becomes a protected micrometer datum surface (1115). With this variation, the protected micrometer datum surface (1115) would provide for a protected reference surface for verification of micrometer (1100, FIG. 11B) accuracy.

FIGS. 12A and 12B illustrate using the multi-instrument calibration standard (100) to verify and calibrate the accuracy of a protractor (1200). In FIG. 12A, the angle scale plate (1205) of the protractor (1200) is aligned against a first angled surface (165) of the multi-instrument calibration standard (100). The moveable arm (1210) of the protractor (1200) is aligned against the plateau or micrometer datum surface (205). Measurements can then be taken by reading where the angle indicator (1215) lines up with the scale on the angle scale plate (1205). This measurement can be compared to a known measurement of the angle of the first angled surface (165) of the multi-instrument calibration standard (100). The protractor can then be adjusted to match the known measurement angle of the first angled surface (165).

FIG. 12B is a diagram showing the alignment and calibration of the protractor angle scale plate (1205) with a second angled surface (175) of the multi-instrument calibration standard (100). The moveable arm (1210) of the protractor (1200) is aligned against the top surface (180) of the multi-instrument calibration standard (100). Measurements can then be taken by reading where the angle indicator (1215) lines up with the scale on the angle scale plate (1205). The second angled surface has been premeasured and has a known angle measurement. This measurement can be compared to the measurements that were taken on the angle indicator (1215) and the protractor (1200) can be adjusted as needed.

Figure 13:
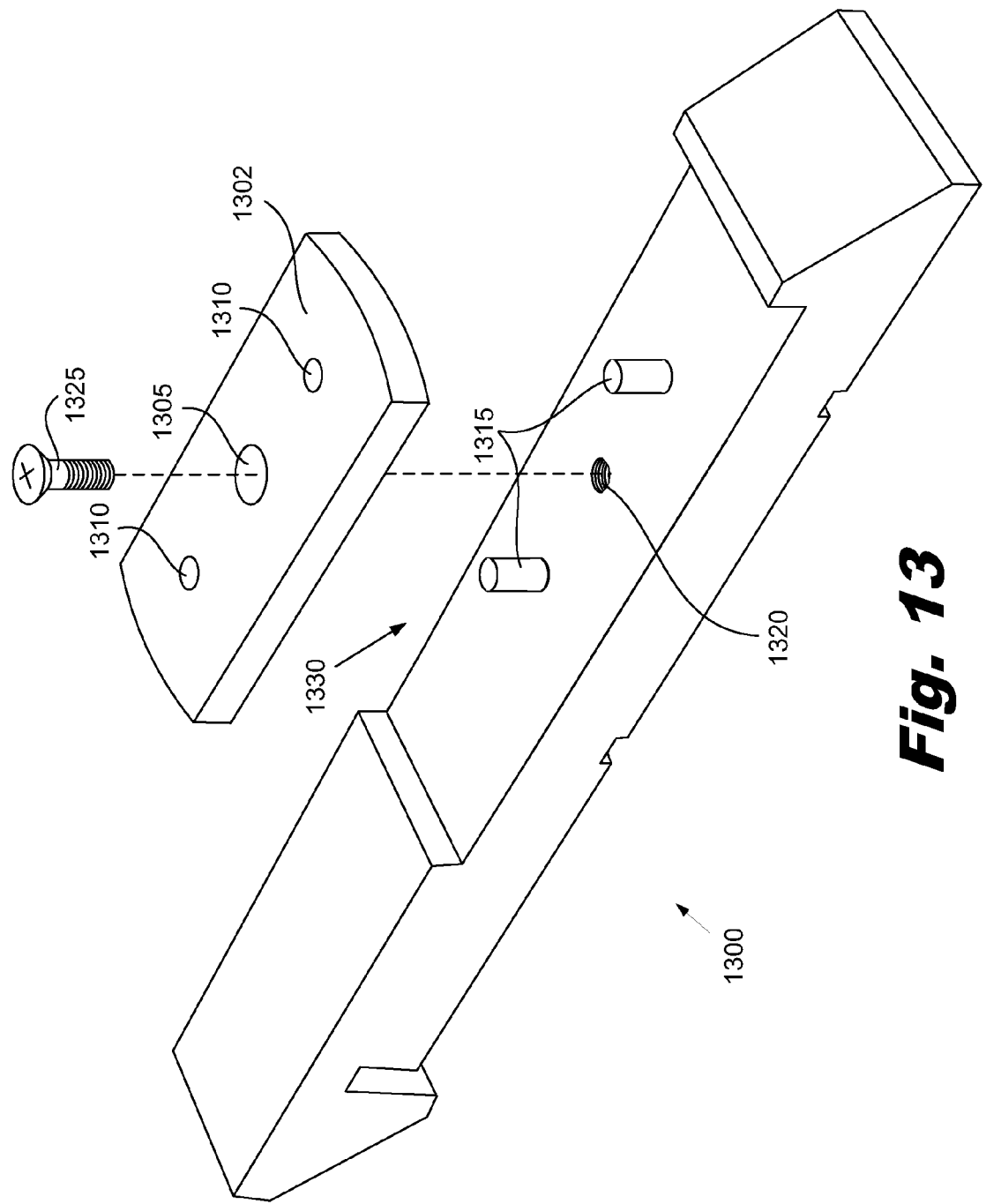
FIG. 13 is an example of a modified multi-instrument calibration standard with a replaceable outside measurement gage block, according to one embodiment of principles described herein.

FIG. 13 is an example of a modified multi-instrument calibration standard (1300) with a replaceable outside measurement gage block (1302). The recess area (1330) of the modified multi-instrument calibration standard (1300) is milled to accept alignment pins (1315). A threaded screw hole (1320) is also milled and threaded into the recess area (1330) of the modified multi-instrument calibration standard (1300). Pin holes (1310) are drilled into the replaceable outside measurement gage block (1302) to receive the alignment pins (1315) when attaching the replaceable outside measurement gage block (1302) to the modified multi-instrument calibration standard (1300). A mounting screw hole (1305) is also drilled in the outside measurement gage block (1302) to receive the mounting screw (1325). The replaceable outside measurement gage block (1302) is placed on the recess area (1330), lining up the pin holes (1310) with the pins (1315) that are located on the recess area (1330). The mounting screw (1325) is then used to secure the replaceable outside measurement gage block (1302) to the modified multi-instrument calibration standard (1300) by placing the mounting screw (1325) into the mounting screw hole (1305) and tightening it into the threaded screw hole (1320) in the recess area (1330). This tool can then be used to verify the accuracy of calipers as described in FIGS. 5, 6, and 7.

Figure 14:
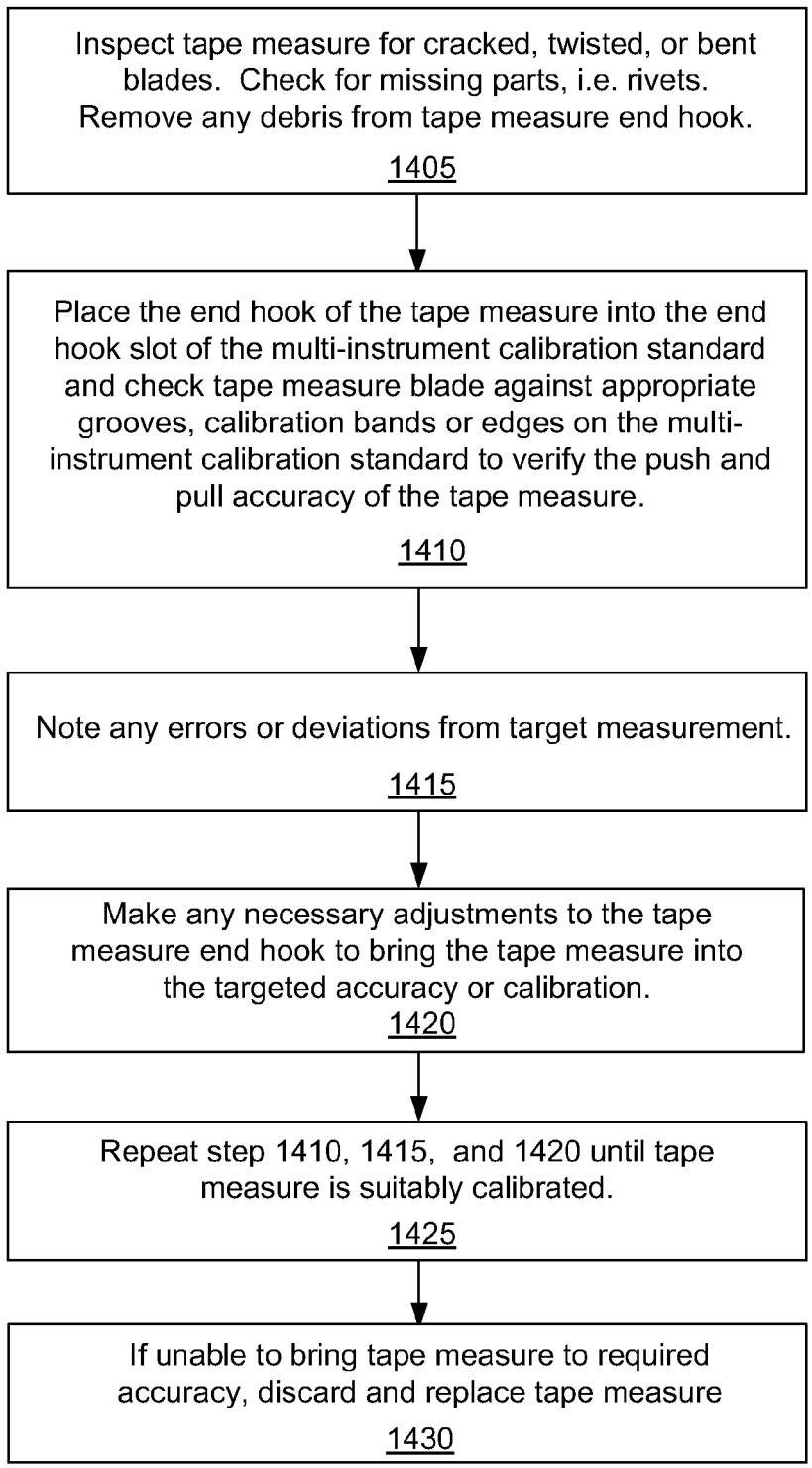
FIG. 14 is a flowchart describing a method for calibrating tape measures using a multi-instrument calibration standard, according to one embodiment of principles described herein.

FIG. 14 is a flowchart describing a method for calibrating tape measures (1400) using a multi-instrument calibration standard. To calibrate a tape measure, the tape measure is inspected for cracked, twisted, or bent blades. Also, the tape measure needs to be checked to determine if there are any missing parts, i.e. rivets. Any debris found in the tape measure end hook is removed (step 1405).

Once the tape measure has been inspected, the end hook of the tape measure is placed into the end hook slot of the multi-instrument calibration standard and the tape measure blade is checked against appropriate grooves, calibration bands, or edges on the multi-instrument calibration standard to verify the push and pull accuracy of the tape measure (step 1410). Errors or deviations from the target measurement are then noted (step 1415). Once the errors or deviations have been noted, any necessary adjustments are made to the tape measure end hook to bring the tape measure into the targeted accuracy or calibration (step 1420). Steps 1410, 1415, and 1420 are repeated until the tape measure is suitably calibrated (step 1425). If the tape measure is unable to be brought to required accuracy, the tape measure may need to be discarded and replaced (step 1430).

Figure 15:
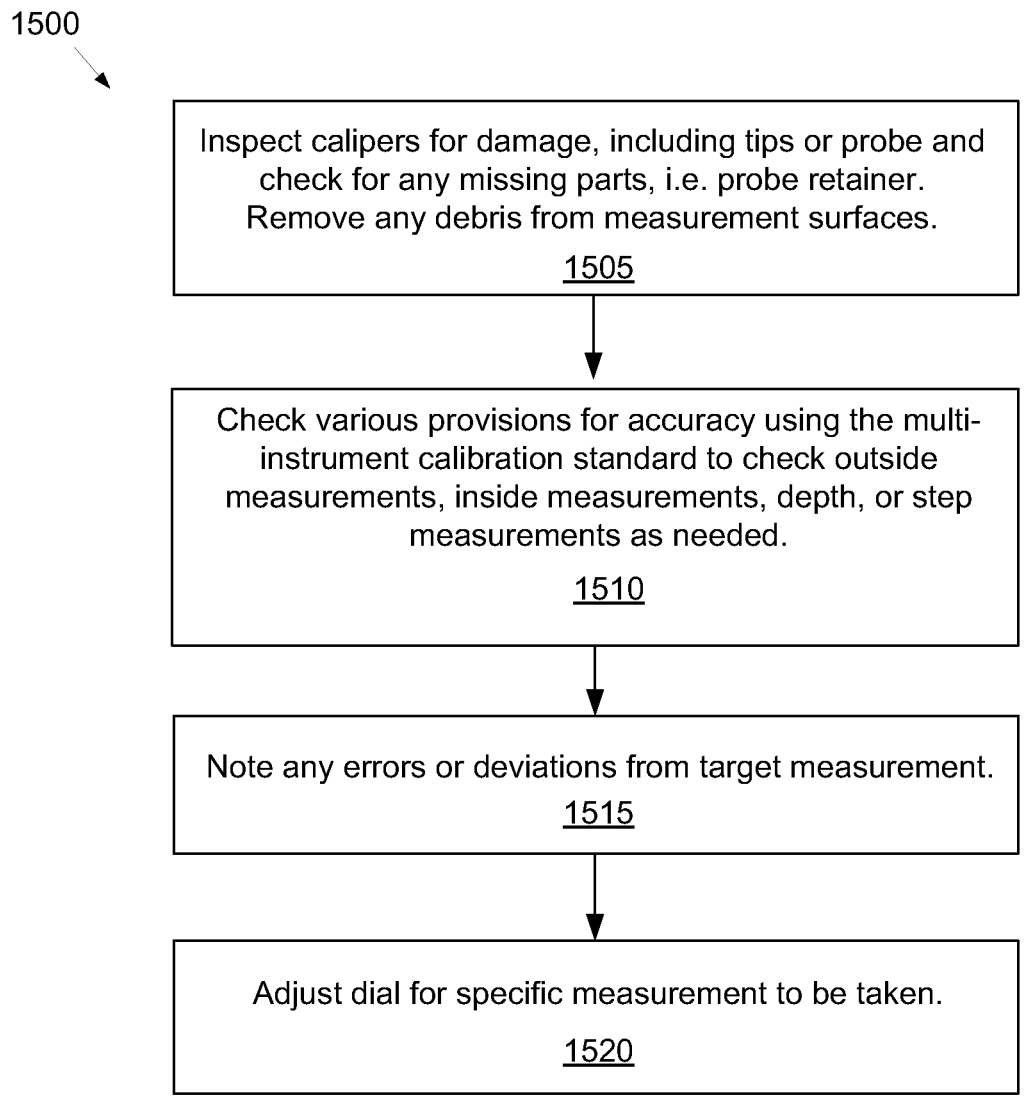
FIG. 15 is a flowchart describing a method for calibrating calipers using a multi-instrument calibration standard, according to one embodiment of principles described herein.

FIG. 15 is a flowchart describing a method for calibrating calipers (1500) using a multi-instrument calibration standard. To calibrate a caliper, the caliper is inspected for damage, including the tips or probe. Also, the caliper needs to be checked to determine if there are any missing parts, such as a missing probe retainer. Any debris found on the measurement surfaces is removed (step 1505). Various provisions are checked for accuracy using the multi-instrument calibration standard to check outside measurements, inside measurements, depth, or step measurements as needed (step 1510). Errors or deviations from the target measurement are then noted (step 1515). The dial on the caliper can be adjusted if desired to produce more accurate measurements. (step 1520)

Figure 16:
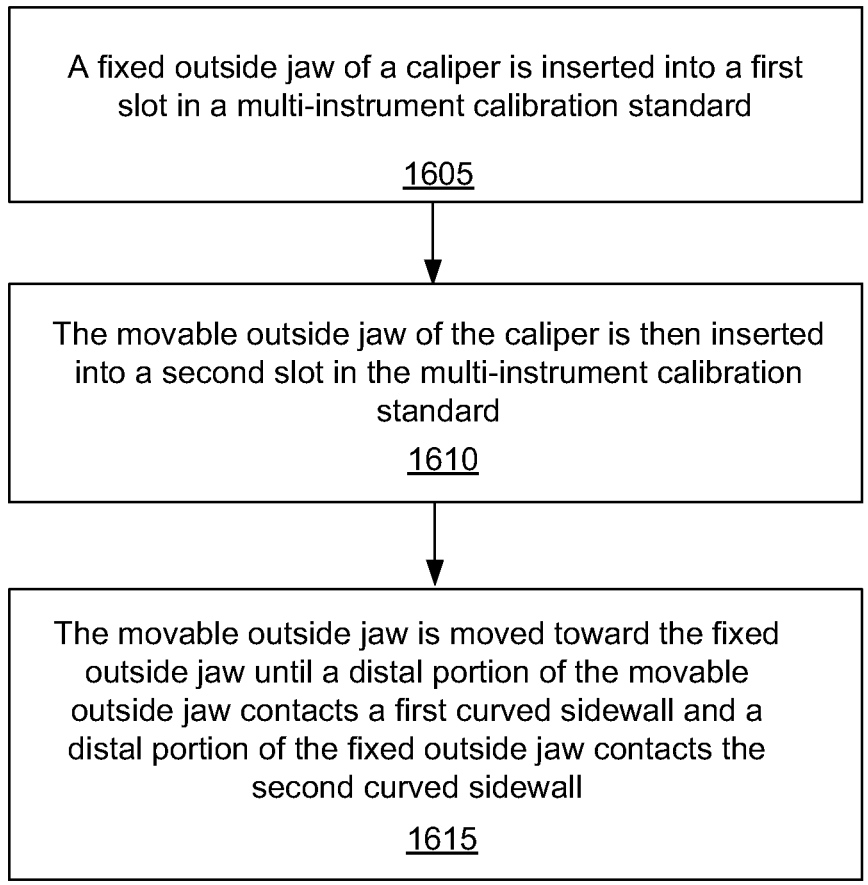
FIG. 16 is a flowchart describing a method for calibrating various measurements of a caliper using a multi-instrument calibration standard, according to one embodiment of principles described herein.

FIG. 16 is a flowchart describing a method (1600) for calibrating various measurements of a caliper using a multi-instrument calibration standard. A fixed outside jaw of a caliper is inserted into a first slot ("gage block cutouts" in FIGS. 2-8) on a multi-instrument calibration standard (step 1605). The first slot has a first curved sidewall and a first straight sidewall. The movable outside jaw of the caliper is then inserted into a second slot in the multi-instrument calibration standard (step 1610). The second slot has a second curved sidewall and a second straight sidewall. The movable outside jaw is moved toward the fixed outside jaw until a distal portion ("tip" in FIG. 5) of the movable outside jaw contacts a first curved sidewall and a distal portion of the fixed outside jaw contacts the second curved sidewall (step 1615).

When the fixed outside jaw and the moveable outside jaw have contacted the first and second curved sidewalls, a measurement of the distance between the distal portion of the movable outside jaw and the distal portion of the fixed outside jaw is noted. This first distance is compared to a known dimension of an outside measurement gage block. Once this distance has been noted, a second measurement may be obtained. To obtain the second measurement, the moveable outside jaw is moved away from the fixed outside jaw. The moveable outside jaw and the fixed outside jaw are then inserted deeper into the first slot and second slot. The movable outside jaw is moved toward the fixed outside jaw until a proximal portion of the movable outside jaw contacts a first curved outside measurement surface of the outside measurement gage block of the multi-instrument calibration standard and a proximal portion of the fixed outside jaw contacts a second curved outside measurement surface of the outside measurement gage block. When the fixed outside jaw and the moveable outside jaw have contacted the first and second curved sidewalls of the outside measurement gage block, a measurement of the distance between the proximal portion of the movable outside jaw and the proximal portion of the fixed outside jaw is noted. This second distance is compared to a known dimension of an outside measurement gage block. Abbé error for the caliper can then be calculated by comparing the first measured distance to the second measured distance.

An inside measurement of a caliper can also be calibrated using a multi-instrument calibration standard. The moveable jaw of a caliper is opened until the fixed inside jaw and the moveable inside jaw contact sidewalls of the plateaus. This inside measurement is noted and is compared to the known distance of the sidewalls. The dial of the caliper can then be adjusted if needed.

When calibrating a depth probe of a caliper using a multi-instrument calibration standard, the front end of the caliper rail is placed on a reference surface of the multi-instrument calibration standard. The depth probe of the caliper is extended into a cutout with a bottom surface. The caliper then measures the vertical offset between the reference surface and the bottom surface ("depth").

Figure 17:
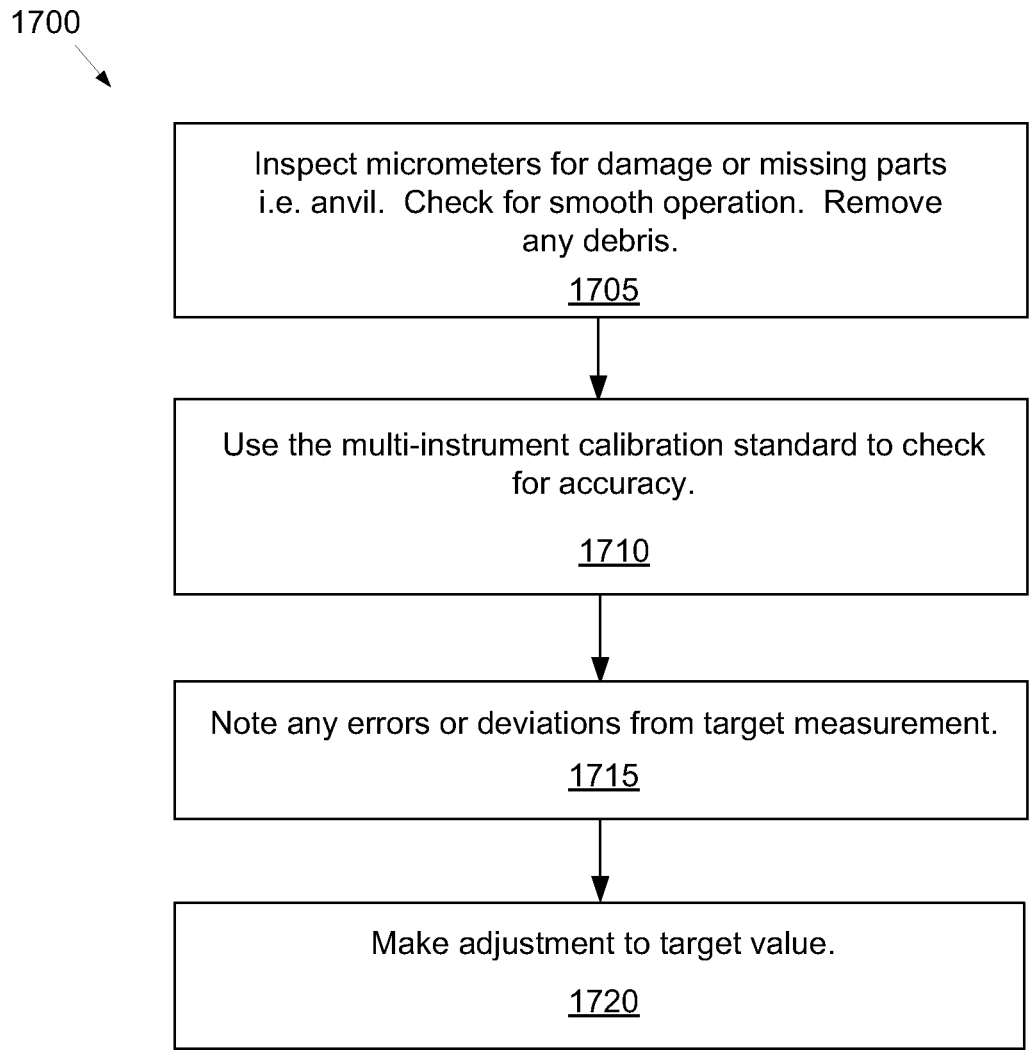
FIG. 17 is a flowchart describing a method for calibrating micrometers using a multi-instrument calibration standard, according to one embodiment of principles described herein.

FIG. 17 is a flowchart describing a method for calibrating micrometers (1700) using a multi-instrument calibration standard. To calibrate micrometers, the micrometers are inspected for damage or missing parts, such as the anvil. Also, the micrometer needs to be checked for smooth operation. Any debris found on the micrometer during the inspection is removed (step 1705). A multi-instrument calibration standard is used to check the micrometer for accuracy (step 1710). Errors or deviations from the target measurement are then noted (step 1715) and adjustments are made to the micrometer to bring to the desired level of calibration (step 1720). In some embodiments, the anvil of the micrometer is placed onto a recessed surface of the multi-instrument calibration standard. The spindle of the micrometer is then moved to contact an opposing surface, wherein a distance between the recessed surface and opposing surface is a known distance with a predetermined accuracy. The distance between the anvil and the spindle is read and compared to the known distance between the recessed surface and opposing surface.

Figure 18:
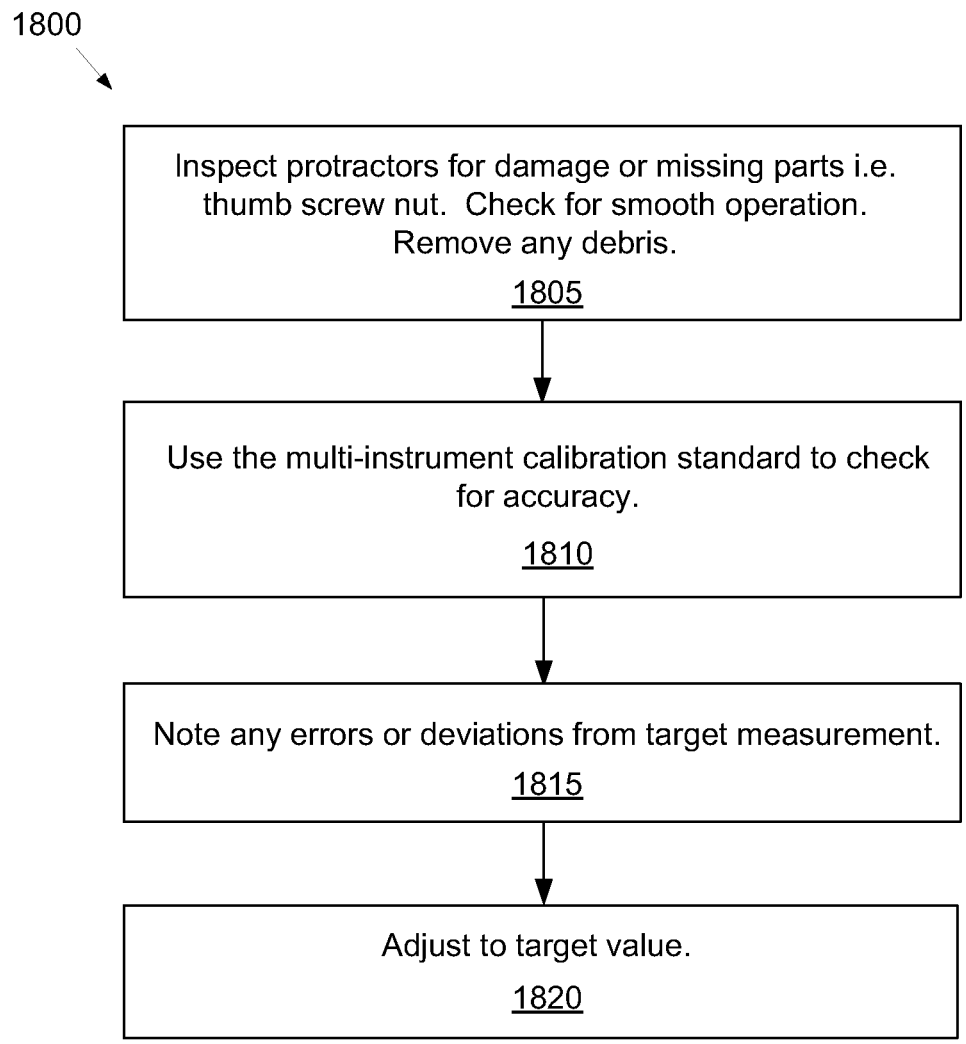
FIG. 18 is a flowchart describing a method for calibrating protractors using a multi-instrument calibration standard, according to one embodiment of principles described herein.

FIG. 18 is a flowchart describing a method for calibrating protractors (1800) using a multi-instrument calibration standard. To calibrate protractors, the protractors are inspected for damage or missing parts, i.e. thumb screw nut. Also, the protractors need to be checked for smooth operation. Any debris found on the protractor during the inspection is removed (step 1805). A multi-instrument calibration standard is used to check the protractor for accuracy (step 1810). Errors or deviations from the target measurement are then noted (step 1815) and adjustments are made to bring the protractor into the desired calibration (step 1820). If the desired level of calibration accuracy/precision cannot be achieved, the tool is repaired or discarded.

The purpose of using outside measurement gage blocks with NIST traceable measurements is to identify and calibrate precision measuring tools to known values. In general, tools with moving parts are subject to wear and damage from mishandling or abuse. When tools that have errors are used, costly mistakes are made. In addition, errors known as Abbé errors can be identified and corrected for. A protected outside measurement gage block with curved outside measurement surfaces assists in identifying these errors and reducing mistakes. Protecting these reference surfaces from wear or damage helps maintain the accuracy of the outside measurement gage block. In some examples, the reference surfaces are designed to be replaceable in a cost effective manner.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A calibration standard comprising:
    a rectangular body; and
    a first plateau disposed at one end of the rectangular body;
    a second plateau disposed at an opposite end of the rectangular body;
    an outside measurement gage block disposed in a recess of the rectangular body wherein:
        the outside measurement gage block is separated from the first plateau by a first slot having a first curved sidewall and a first straight sidewall; and
        the outside measurement gage block is separated from the second plateau by a second slot having a second curved sidewall and a second straight sidewall;
        the curved sidewalls comprise outside calibration surfaces for caliper verification; and
        the straight sidewalls comprise inside calibration surfaces for caliper verification.

2. The calibration standard of claim 1, in which the calibration surfaces are cylindrical.

3. The calibration standard of claim 1, in which the outside measurement gage block comprises a section of a cylindrical disk.

4. The calibration standard of claim 1, in which the outside measurement gage block is removably attached to the rectangular body.

5. The calibration standard of claim 1, wherein the first slot and the second slot ae not in contact with one another.

6. The calibration standard of claim 1, wherein the outside measurement gage block is defined by the first curved sidewall, the second curved sidewall that are opposite one another and parallel gage block sidewalls that are opposite one another.

7. The calibration standard of claim 1, wherein:
    the rectangular body further comprises alignment pins; and
    the outside measurement gage block comprises pin holes to receive the alignment pins.

8. The calibration standard of claim 1, further comprising a reference surface and a slot adjacent to the reference surface, wherein an offset distance between the reference surface and a bottom surface of the slot is a known distance to a predetermined level of accuracy, wherein the slot is configured to receive a depth probe of the caliper while an end of the caliper rests on the reference surface.

9. The calibration standard of claim 8, further comprising a recessed surface opposing the reference surface, wherein the recessed surface is configured to accept an anvil of a micrometer while a spindle of the micrometer contacts the reference surface.

10. The calibration standard of claim 1, further comprising a first angled end to calibrate a protractor, the first angled surface having a first known angle and being adapted to receive an arm of the protractor while an angle scale plate of the protractor contacts a bottom surface of the calibration standard.

11. The calibration standard of claim 10, further comprising a second angled surface to calibrate the protractor, the second angled surface having a second known angle and being adapted to receive an angle scale plate of the protractor while the arm of the protractor contacts either the bottom surface or an upper surface of the calibration standard.

12. A calibration system comprising:
    a rectangular body having a top surface and a bottom surface;
    a tape measure calibration standard disposed on the top surface;
    a reference surface disposed on the top surface;
    a slot adjacent the reference surface also disposed on the top surface; and
    a caliper calibration standard disposed on the bottom surface, wherein the caliper calibration standard comprises:
        a first plateau disposed at one end of the rectangular body;
        a second plateau disposed at an opposite end of the rectangular body, wherein the second plateau comprises a recessed surface disposed at an end portion of the second plateau;
        a protected gage block disposed on the rectangular body between the first plateau and the second plateau, wherein:
            the protected gage block comprises a section of a cylindrical disk
            the protected gage block is separated from the first plateau by a first slot having a first curved sidewall and a first straight sidewall; and
            the protected gage block is separated from the second plateau by a second slot having a second curved sidewall and a second straight sidewall;
            the curved sidewalls comprise outside calibration surfaces for caliper verification; and
            the straight sidewalls comprise inside measurement surfaces for caliper verification.

13. The calibration system of claim 12, wherein the plateaus are laterally spaced away from the curved reference surfaces of the gage block to create spaces between the curved outside measurement surfaces and sidewalls of the plateaus.

14. A method for calibration comprising:
    inserting a fixed outside jaw of a caliper into a first slot in a calibration standard, in which the first slot comprises a first curved sidewall and a first straight sidewall;
    inserting a movable outside jaw of the caliper into a second slot in the calibration standard, in which the second slot comprises a second curved sidewall and a second straight sidewall; and
    moving the movable outside jaw toward the fixed outside jaw until a distal portion of the movable outside jaw contacts a first curved sidewall and a distal portion of the fixed outside jaw contacts the second curved sidewall.

15. The method of claim 14, further comprising:
    placing an end of the caliper on a reference surface of the calibration standard; and extending a depth probe of the caliper into a cutout with a bottom surface that is an offset from the reference surface;
reading a measured distance from the caliper; and
comparing the measured distance to a known distance.

16. The method of claim 14, further comprising:
placing an anvil of a micrometer onto a recessed surface of the calibration standard; and
moving a spindle of the micrometer to contact an opposing surface, wherein a distance between the recessed surface and opposing surface is a known distance with a predetermined accuracy;
reading a measured distance between the anvil and the spindle; and
comparing the measured distance to the known distance.

17. The method of claim 14, further comprising:
measuring a distance between the distal portion of the movable outside jaw and the distal portion of the fixed outside jaw; and
comparing the distance to a dimension of an outside measurement gage block.

18. The method of claim 17, further comprising:
moving the movable outside jaw away from the fixed outside jaw;
inserting the movable outside jaw and the fixed outside jaw perpendicularly into the first slot and the second slot such that a distance between a rail of the caliper and an outside measurement gage block defined by the first curved sidewall and the second curved sidewall is decreased upon insertion; and
moving the movable outside jaw toward the fixed outside jaw until a proximal portion of the movable outside jaw contacts a first curved outside measurement surface of an outside measurement gage block of the calibration standard and a proximal portion of the fixed outside jaw contacts a second curved outside measurement surface of the outside measurement gage block.

19. The method of claim 18, further comprising:
measuring a second distance between the distal portion of the movable outside jaw and the distal portion of the fixed outside jaw;
comparing the second distance to a dimension of the outside measurement gage block; and
calculating an Abbé error for the caliper by comparing the first measured distance to the second measured distance.

20. The method of claim 19, further comprising calibrating an inside measurement capability of the caliper by opening the movable jaw until a fixed inside jaw and the movable inside jaw contact sidewalls of the plateaus, in which a distance between the sidewalls of the plateaus are known to a predetermined level of accuracy.

* * * * *